United States Patent
Park et al.

(10) Patent No.: US 10,326,602 B2
(45) Date of Patent: Jun. 18, 2019

(54) GROUP SIGNATURES WITH PROBABILISTIC REVOCATION

(71) Applicants: Jung-Min Park, Fairfax, VA (US); Vireshwar Kumar, Blacksburg, VA (US)

(72) Inventors: Jung-Min Park, Fairfax, VA (US); Vireshwar Kumar, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 15/759,711

(22) PCT Filed: Sep. 16, 2016

(86) PCT No.: PCT/US2016/052171
§ 371 (c)(1),
(2) Date: Mar. 13, 2018

(87) PCT Pub. No.: WO2017/049111
PCT Pub. Date: Mar. 23, 2017

(65) Prior Publication Data
US 2019/0052470 A1    Feb. 14, 2019

Related U.S. Application Data

(60) Provisional application No. 62/220,650, filed on Sep. 18, 2015.

(51) Int. Cl.
*H04L 9/32* (2006.01)
*H04L 9/08* (2006.01)
*H04L 9/30* (2006.01)

(52) U.S. Cl.
CPC .......... *H04L 9/3255* (2013.01); *H04L 9/0833* (2013.01); *H04L 9/0891* (2013.01);
(Continued)

(58) Field of Classification Search
None
See application file for complete search history.

(56) References Cited

U.S. PATENT DOCUMENTS

| 5,699,431 A | 12/1997 | Oorschot et al. |
| 2003/0115466 A1 | 6/2003 | Aull et al. |

(Continued)

OTHER PUBLICATIONS

Efficient Certificate Revocation by Silvio Micali, MIT published Mar. 22, 1996.*

(Continued)

*Primary Examiner* — Lynn D Feild
*Assistant Examiner* — Richard A McCoy
(74) *Attorney, Agent, or Firm* — Thomas Horstemeyer, LLP

(57) ABSTRACT

Aspects of group signatures with probabilistic revocation are described. In one example employing these aspects, at least one computing device can map an alias token to an alias code comprising a plurality of alias code segments. Each of the alias code segments is based at least in part on a set of orthogonal codes. Also, each of the alias code segments corresponds to a segment of the alias token. A revocation code is based at least in part on a plurality of revoked alias codes. One of the alias code segments and a corresponding segment of the revocation code can be utilized to determine a revocation status of the alias token.

20 Claims, 7 Drawing Sheets

(52) U.S. Cl.
CPC .......... *H04L 9/3073* (2013.01); *H04L 9/3218* (2013.01); *H04L 2209/42* (2013.01)

(56) References Cited

U.S. PATENT DOCUMENTS

| | | |
|---|---|---|
| 2007/0011116 A1* | 1/2007 | Vauclair .................. G06F 21/00 706/16 |
| 2007/0053513 A1 | 3/2007 | Hoffberg et al. |
| 2007/0127719 A1* | 6/2007 | Selander ............... H04L 9/0861 380/277 |
| 2010/0091982 A1 | 4/2010 | Kocher et al. |
| 2012/0017083 A1 | 1/2012 | Canard et al. |
| 2012/0274444 A1* | 11/2012 | Micali ................ G07C 9/00031 340/5.65 |

OTHER PUBLICATIONS

Efficient Certificate Revocation List Organiszation and Distribution by Jason Haas, et al published by IEEE Mar. 2011.*
International Search Report for PCT/US2016/052171 dated Dec. 20, 2016.

* cited by examiner

GROUP SIGNATURES WITH PROBABILISTIC REVOCATION

CROSS-REFERENCE TO RELATED APPLICATIONS

This application is the 35 U.S.C. § 371 national stage application of PCT Application No. PCT/US2016/052171, filed Sep. 16, 2016, where the PCT claims priority to U.S. Provisional Application No. 62/220,650, filed on Sep. 18, 2015, both of which are herein incorporated by reference in their entireties.

STATEMENT REGARDING FEDERALLY SPONSORED RESEARCH OR DEVELOPMENT

This invention was made with government support under Grant Nos. 1314598, 1265886, and 1431244, awarded by the National Science Foundation. The government has certain rights in the invention.

BACKGROUND

Authentication can enable a sender to provide trustworthy proof of identity and origination to communication partners, for example, with a verifiable signature. This is an important security attribute for current applications that rely on electronic communications over insecure or public networks. The sender's identity should be protected for some applications while maintaining verifiable proof of identity and origination. Group signatures (GSs) can provide such privacy-preserving authentication (PPA). A wide variety of applications use PPA, including safety applications for vehicular networks, identity escrow schemes, anonymous credential systems, remote attestation of computing platforms, and device-to-device communications in the Internet-of-Things (IoT) paradigm. However, modern GS schemes have limited practical value for use in large networks. For example, current GS schemes use deterministic revocation, going through a revocation list and checking whether any of the revoked tokens in the revocation list correspond to a received signature. These schemes have high computational complexity of their revocation check procedures when there are a large number of revoked keys.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
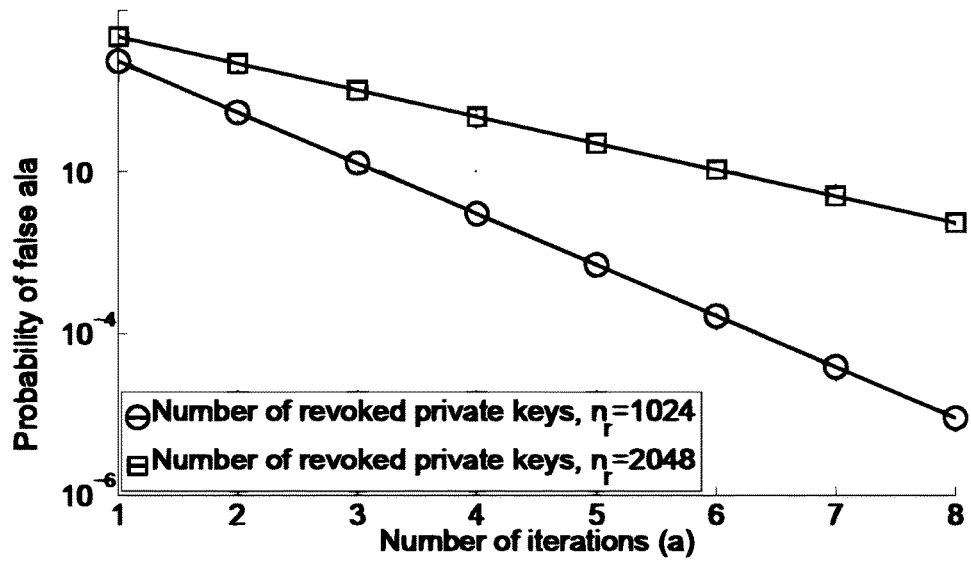
FIG. 1 is a graph that shows example false alarm probabilities for numbers of iterations performed, according to various examples described herein.

The present disclosure relates to using group signatures with probabilistic revocation (GSPR) techniques. As discussed above, current GS schemes use deterministic revocation, going through a revocation list and checking whether a received signature corresponds to any of the revoked tokens identified in the list. These schemes have high computational complexity of their revocation check procedures when there are a large number of revoked keys. As device to device communications in the Internet-of-Things (IoT) paradigm expands and more applications use PPA, the revocation bottleneck of current GS schemes using deterministic revocation becomes more problematic. However, embodiments described herein include an authentication scheme using GSPR, which is capable of greater scalability with regard to revocation.

GSPR's revocation check procedure does not produce deterministic results, but instead produces probabilistic results, which may include false positive (i.e., false alarm) results but no false negative results. Here, a false negative result refers to an instance in which the revocation check fails to detect that the revocation token associated with the received signature is included in the revocation list, or incorrectly determines that the revocation token is not included in the revocation list. A false positive result refers to an instance in which the revocation check incorrectly determines that the revocation token is included in the revocation list. GSPR includes a procedure that can be used to iteratively decrease the probability of false alarms. The use of probabilistic revocation rather than deterministic revocation enables GSPR to address the revocation bottleneck of GSs. In this discussion, entities involved in group authentication include a signer, a verifier, and a group manager.

Much of the computational efficiency of the GSPR revocation check procedure is made possible by the use of alias codes. Each alias code can be a vector of +1s and −1s with desirable cross-correlation properties, and each alias code can be mapped to an alias token included in each signature. A signer sends a message with a signature including the alias token. The group manager creates a revocation code by adding all of the alias codes mapped to revoked alias tokens, and then distributes this to the verifiers. The verifier can perform the revocation check procedure by first mapping the signature's alias token to an alias code, and then computing the cross correlation of the alias code and the revocation code. Note that the verifier is able to check whether a particular alias code is included in the revocation code using a cross-correlation operation, and thus avoids the burden of legacy GS schemes in which the verifier needs to check each revocation token in the revocation list. Because of the probabilistic nature of the revocation check procedure, its result is not guaranteed to be correct with certainty, but only with a certain probability.

According to one example, a computer-implemented method can include receiving a signature including an alias token. Next, the alias token can be mapped to an alias code comprising a plurality of orthogonal alias code segments. A revocation code is received, The revocation code is a sum of at least one revoked alias code. The revocation code comprises a plurality of revocation code segments. The plurality of revocation code segments correspond to the plurality of alias code segments. A revocation status of the alias token is probabilistically determined based at least in part on at least one of the alias code segments and a corresponding at least one of the revocation code segments.

Another example includes a system with a computing device and instructions executable in the at least one computing device. When executed, the instructions cause the computing device to perform a number of actions. The computing device determines a set of orthogonal codes. An alias token is determined to be a revoked alias token. The alias token is separable into a plurality of alias token segments of a predetermined number of bits. The plurality of alias token segments are mapped to a corresponding plurality of alias code segments. These alias code segments are based at least in part on the set of orthogonal codes. The computing device generates an alias code by concatenating the plurality of alias code segments. A revocation code is the sum of a plurality of revoked alias codes including the revoked alias code.

In a further example, a system includes a computing device and instructions executable in the at least one computing device. The computing device receives a signature including an alias token. The alias token is mapped to an alias code comprising a plurality of alias code segments. Each of the alias code segments corresponds to a segment of the alias token and is based on a set of orthogonal codes. The computing device also receives a revocation code. The revocation code is based on a plurality of revoked alias codes. The computing device performs a cross-correlation of one of the alias code segments with a corresponding segment of the revocation code.

Moving to the figures, FIGS. 1-5 are discussed with reference to some of the examples discussed below.

Figure 6:
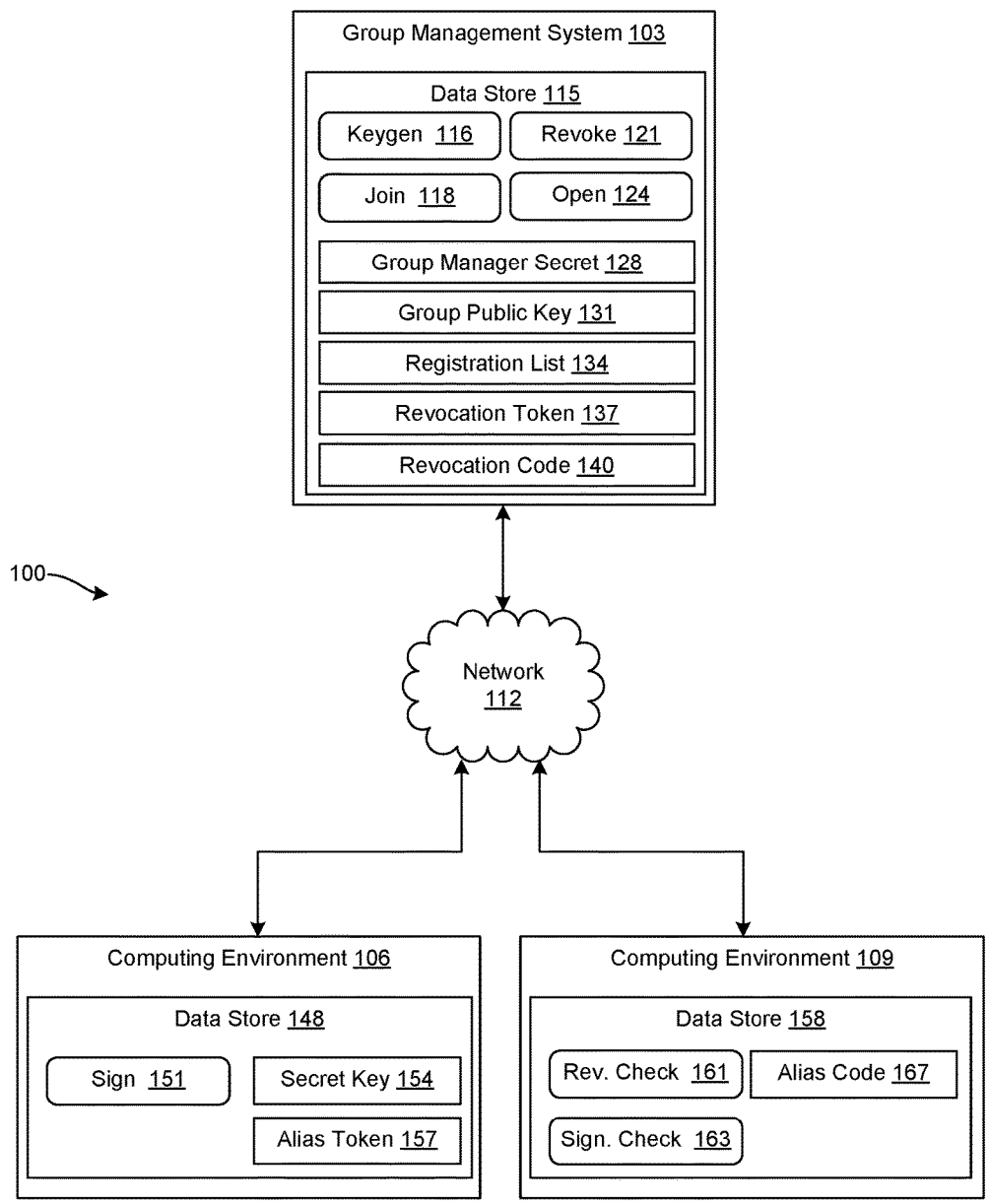
FIG. 6 illustrates an example of a networked environment having a group management system and two computing environments connected via a network.

FIG. 6 illustrates a networked environment 100 having a group management system 103, a computing environment 106, and a computing environment 109, each connected to a network 112. The components of the networked environment 100 can be utilized to provide authentication using group management with probabilistic revocation.

The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The group management system 103 can represent a group manager, and can include, for example, a server computer or any other system providing computing capability. Alternatively, the group management system 103 can include a plurality of computing devices that are arranged, for example, in one or more server banks, computer banks, or other arrangements. The group management system 103 can include a grid computing resource or any other distributed computing arrangement. The computing devices can be located in a single installation or can be distributed among many different geographical locations. The group management system 103 can also include or be operated as one or more virtualized computer instances. For purposes of convenience, the group management system 103 is referred to herein in the singular. Even though the group management system 103 is referred to in the singular, it is understood that a plurality of group management system 103 can be employed in the various arrangements as described above. Each of the computing environments 106 and 109 can include similar elements.

The group management system 103 or devices comprising the group management system 103, the management system 106 and the management system 108 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure. Stored in the memory device are both data and several components that are executable by the processor.

In particular, the components executed on the management system 103 can include a data store 115. Functions can be stored in the data store 115 or otherwise in its memory, including a keygen function 116, a join function 118, a revoke function 121, an open function 124, and other functionalities. The functionalities stored in the data store 115 can also be referred to as software components, algorithms, programs, or instructions executable by the group management system 103. The data store 115 can also include group manager secret 128, group public key 131, registration list 134, revocation token 137, revocation code 140, among other data items. While the items in the data store are sometimes referred to in the singular for clarity, they can be representative of many such data items.

To begin, a security parameter parameter $\lambda$ can be in the set of natural numbers $\mathbb{N}$. A bilinear group pair ($\mathbb{G}_1$, $\mathbb{G}_2$) can have an isomorphism $\psi$ from $\mathbb{G}_2$ to $\mathbb{G}_1$. $\mathbb{Z}^*_p$ can be the set of integers modulo p, from which alias tokens can be taken. $\mathbb{Z}^*_p$ can be mapped to $\mathbb{C}_p$ using a mapping function such that $F_c : \mathbb{Z}^*_p \to \mathbb{C}_p$. Each element in $\mathbb{C}_p$ can be an alias code which can be a vector of +1s and −1s of a certain length. $H_z$ and $H_g$ can be collision resistant hash functions treated as random oracles where $H_z : \{0, 1\}^* \to \mathbb{Z}^*_p$ and $H_g : \{0, 1\}^* \to \mathbb{G}_2^2$. With these concepts in mind, the following functions of GSPR can be described.

The keygen function 116 can be utilized to generate the group manager secret(s) 128 and public key(s) 131. The keygen function 116 can select a generator $$g_2 \xleftarrow{R} \mathbb{G}_2,$$

where $$\xleftarrow{R}$$

represents a random selection. The keygen function 116 can then use isomorphism $\psi$ to set $g_1 = \psi(g_2)$ such that $g_1$ is a generator of $\mathbb{G}_1$. Next, the keygen function 116 can select $$\gamma \xleftarrow{R} \mathbb{Z}^*_p,$$

and compute $w_k = g_2^{\gamma^k}$, $\forall k \in [0, m]$. Note that $w_0 = g_2$. The group public key 131 can be $gpk = (g_1, g_2, w_1, w_2, \ldots w_m)$. The group manager secret 128 held by the group management system 103 can be given by $gms = \gamma$. The output of this algorithm can be the group public key 131 and the group manager secret 128.

The join function 118 can be utilized to add a signer to a group, for example by adding an entry for the signer in the registration list 134 corresponding to the group. The join function 118 can also generate a set of alias tokens, as well as a secret key 154 and a revocation token 137 corresponding to the set of alias tokens. For example, the join function 118 can select a random selection from the set of integers modulo p, $$y_i \xleftarrow{R} \mathbb{Z}_p^*$$

and compute the set of m alias token(s) 157 such that each alias token $x_{ik}$ in a set of alias tokens $X_i$ can be the result of a hash function $H_z(y_i, k)$, that can be a function of the random selection from the set of integers modulo p, and k is a set of integers from 1 to m such that $X_i = \{x_{ik} : x_{ik} = H_z(y_i, k), \forall k \in [1, m]\}$. The revocation token 137 can be $grt_i = X_i$, and the entry in the registration list 134 can be $reg_i = X_i$.

Next, the join function 118 can compute a polynomial having variable $\gamma$ and each alias token in the set of alias tokens. For example, $\pi_i = \Pi_{k=1}^m (\gamma + x_{ik})$. Further, the join function 118 can generate the secret key 154 based on the random selection from the set of integers modulo p, the polynomial, and the generator of one of the bilinear group pairs. For example, the secret key 154 can be $gsk_i = (A_i, y_i)$, where $A_i = g_1^{1/\pi_i}$.

The revocation token 137 can be used to revoke the set of alias tokens corresponding to the signer's secret key. The sign function 151 can perform signature generation. While the secret key(s) 154 and alias token(s) 157 are shown in a data store 148 of the computing environment 106, they can also be stored in the data store 115.

The revoke function 121 can be utilized to update the revocation code 140, for example, when a particular alias token or set of alias tokens 157 is determined to be compromised. The revocation code 140 can be utilized by the computing environment 109 (e.g. the verifier), to check whether a received signature uses a revoked token, as will be discussed. The revoke function 121 can add revoked alias tokens to the revocation code 140 such that the computing environment 109 can probabilistically determine whether a signature is using a revoked token by utilizing the revocation code 140.

The revoke function 121 can update the revocation code 140 by mapping a revoked alias token 157 to a corresponding alias code 167. The alias code 167 can be a column vector having a certain number of elements, each of which can be a +1 or a −1. The revoke function 121 can add the alias code 167 to the revocation code 140, which can also be a column vector having a certain number of elements resulting from adding a number of revoked alias codes 167. If multiple alias codes 167 are to be added to the revocation code 140, each of the alias codes 167 can be added to the revocation code 140 in turn, or the alias codes can be first added to each other, and the resulting column vector of −1s and +1s can be added to the revocation code 140. In the case that the alias code 167 is the first code, then the revocation code 140 can be the same as the alias code 167. Thus the revocation code 140 can be calculated as the sum of a number of revoked alias codes. Each revocation token 137 can correspond to a secret key 154. Each secret key 154 can correspond to a set of alias tokens 157, and each revocation token 137 can be used to map the set of alias tokens 157 to a corresponding set of alias codes 167, each of which can be added to the revocation code 140.

The open function 124 can be utilized to identify a signer of a signature on a message. The group management system 103 can search the registration list 134 to find the signer that generated the signature. For example, the registration list 134 can hold the set of alias tokens generated by the join function 118 and corresponding to the secret key 154 of the signer, and can be used to identify the signer by extracting an alias token from a message and finding the entry in the registration list 134 that has the alias token.

The computing environment 106 can represent a signer and can be used by applications or devices that use PPA. The computing environment 106 has the data store 148, which stores data including the sign function 151, the secret key 154, and the alias token 157 among other items. The alias token 157 can include a set of alias tokens 157 generated based on the secret key 154. The computing environment 106 can send a message with a signature including the alias token 157.

The sign function 151 can be utilized to generate a signature on a message, the signature having the alias token 157 embedded or included. The sign function 151 can use the group public key 131, the secret key 154, and the alias token 157 to generate the signature with the alias token 157 on a message that the computing environment 106 (e.g. the signer) communicates to the computing environment 109 (e.g. the verifier). To this end, the sign function 151 can receive the parameter $y_i$ from the group management system 103, which can be a random selection from the set of integers modulo p, $$y_i \xleftarrow{R} \mathbb{Z}_p^*,$$

and compute the set of m alias token(s) 157 such that each alias token $x_{ik}$ in a set of alias tokens $X_i$ can be the result of a hash function $H_z(y_i, k)$ such that $X_i = \{x_{ik} : x_{ik} = H_z(y_i, k), \forall k \in [1, m]\}$. Next, the sign function 151 can calculate values to include in a tuple. The tuple can include an ordered list of finite elements that are calculated based on the polynomial $\pi_i = \Pi(\gamma + x_{ik})$, and can further include the alias token $x_{ik}$.

The tuple can, for example, be $(A_i, B_i, C_{ik}, x_{ik})$, which can be generated based on by selecting some value of $k \in [1, m]$. $A_i$ can be calculated by the group management system 103 as $A_i = g_1^{1/\pi_i}$ and communicated to the computing environment 106, for example, with the secret key 154. The computing environment 106 can calculate elements given by $B_i = g_2^{\pi_i} = \Pi_{k=0}^m w_k^{a_k}$, and $C_{ik} = g_2^{\pi_i(\gamma + x_{ik})} = \Pi_{j=0}^{m-1} w_j^{b_j}$. The computing environment 106 (e.g. the signer) can use a particular k to sign signatures in a time interval. After the interval, the alias token corresponding to that k can be discarded. When the signer exhausts all alias tokens, the signer can send a request to the group management system 103 and the join function can be run again to fetch a new secret key and compute a set of new alias tokens. Next, the signature of knowledge (SPK) can be calculated using the Fiat-Shamir heuristic method. The sign function 151 can, for instance, compute values $T_1 = u^\alpha$, $T_2 = A_i v^\alpha$, $T_3 = B_i^\beta$, $T_4 = C_{ik}^\delta$, a challenge $c = H_z(gpk, M, x_{ik}, T_1, T_2, T_3, T_4, R_1, R_2, R_3)$ and responses, $s_\alpha = r_\alpha + c\alpha$, $s_\beta = r_\beta + c\beta$, and $s_\delta = r_\delta + c\delta$. The output of the sign function 151 can be a signature σ that has the alias token $x_{ik}$ embedded in it, as well as additional values that can be used in the verification process. For instance the signature can be σ=($X_{ik}$, $T_1$, $T_2$, $T_3$, $T_4$, c, $s_α$, $s_β$, $s_δ$).

If the computing environment 106 sends request to join as a member of a group associated with the group management system 103, the group management system 103 can add an entry in the registration list 134 corresponding to the group, and generate the revocation token 137, while the computing environment 106 receives the secret key 154 and/or a set of the alias tokens 157 corresponding to the secret key. The entry in the registration list 134 can include the set of alias tokens 157 corresponding to the secret key sent to the signer, and can be used to identify the signer, for example, using the open function 124.

The computing environment 109 can represent a verifier. The computing environment 109 has the data store 158, which stores data including the revocation check 161 and the alias code 167, among other data items. The revocation check 161 can be performed, for example, in response to the computing environment 109 (e.g., the verifier) receiving a message from the computing environment 106 (e.g., the signer). The message can have a signature that includes the alias token 157. The revocation check 161 can obtain the group public key 131 and the revocation code 140 from the group management system 103 or another source. In some instances, any of these items can be stored in the data store 158. The inputs to the revocation check 161 can include the alias token 157, $x_{ik}$, embedded in the signature σ, and the revocation code 140, RC.

Through the revocation check 161, the computing environment 109 can check whether the alias token 157 has been revoked. The alias token 157 can be extracted from the signature and can be mapped to a corresponding alias code 167, which can be a column vector having elements that are each positive one or negative one. The revocation check 161 can compute the alias code 167 as $s_{ik}=F_c(x_{ik})$, where $s_{ik}$ is a column vector of length l of samples of +1s and −1s. The revocation check 161 will output invalid revocation check if x≥τ, where $$z = \frac{1}{l} s_{ik}^T RC,$$

where $s_{ik}^T$ is the transpose of $s_{ik}$, and τ is a pre-determined threshold. Otherwise, the revocation check 161 will output valid.

In some embodiments, the revocation check 161 can be run for segments of the alias code 167 in succession. In this case, the alias token 157 can be divided into multiple segments. Each segment of the alias token 157 can be mapped to a corresponding segment of the alias code 167. These segments can each be orthogonal codes. The orthogonal codes are concatenated to form the complete alias code 167. Thus, the alias code 167 can be a piecewise-orthogonal code comprising a number of orthogonal codes generated based on corresponding segments of the alias token 157.

For instance, a set of $2^{b_s}$ orthogonal codes, denoted by $\mathbb{C}_s$, can be generated where each orthogonal code in $\mathbb{C}_s$ has length $2^{b_s}$. Each orthogonal code in $\mathbb{C}_s$ can be retrieved using a $b_s$-bit index. The alias token 157 having $b_p$ bits (alias token $x_{ik}$ can be in the set $\mathbb{Z}^*_p$) can be divided into d segments each of length $b_s$ bits, such that $d \cdot b_s \leq b_p < (d+1) \cdot b_s$. In this way, the segments of the alias token 157 can be utilized as the $b_s$-bit index to retrieve orthogonal codes in the set of orthogonal codes $\mathbb{C}_s$. Each of these d orthogonal codes retrieved from the d segments of the alias token 157 are segments of the alias code 167, and can be concatenated to generate the alias code 167. For example the d orthogonal codes, $s_{ik,j}$, ∀j∈[1, d], can be concatenated to generate the alias code $s_{ik}$.

The revocation code 140 can be generated by adding or summing the alias codes 167. When the alias codes 167 are generated from orthogonal code segments of length $2^{b_s}$, the length of the resulting revocation code 140 is $l=d \cdot 2^{b_s}$. Such a revocation code 140 has d segments, and can be the same length as each alias code 167. The group manager declares the two public parameters $\mathbb{C}_p$ and $F_c$, such that the set of all possible alias codes $\mathbb{C}_p = \mathbb{C}_s^d$, and the mapping function $F_c$: $\mathbb{Z}^*_p \to \mathbb{C}_p$ is segment-wise indexing.

When the revocation code 140 is generated using the revoke function 121, each segment of the revocation code can be generated by a summation of the corresponding segments of the revoked alias codes. Hence, the generated revocation code 140 also has d segments, represented by $RC_j$, for all j∈[1, d]. Note that due to the property of orthogonal codes, the cross-correlation of a revocation code's segment and an orthogonal code (e.g. an alias code segment) results in 0 if the revocation code was not generated by the orthogonal code, or results in an integral multiple of 1 if the revocation code 140 was generated using the orthogonal code.

Having received a signature with alias token 157, the verifier can run the revocation check 161 for each of the d segments. However, to minimize the computational overhead, the verifier can choose to run the revocation check 161 for any number of iterations from 1 to d iterations, each iteration increasing the certainty of the revocation check 161.

The computing environment 109 can also include a signature check 163, which in some cases can be performed before the revocation check 161. The signature check 163 determines whether the signature on the message is an honest signature. For example, the signature check 163 can check the correctness of a challenge based on the Fiat-Shamir heuristic method such as c $\stackrel{?}{=} H_z$(gpk, M, $x_{ik}$, $T_1$, $T_2$, $T_3$, $T_4$, $\tilde{R}_1$, $\tilde{R}_2$, $\tilde{R}_3$). This can involve computing (û, v̂)=$H_g$ (gpk, M, $x_{ik}$), and calculating their images in $\mathbb{G}_1$, i.e., u=ψ(û) and v=ψ(v̂). $\tilde{R}_1 = u^{s_\alpha} T_1^{-c}$, $\tilde{R}_2 = e(v, T_3)^{s_\alpha} e(g_1, g_2)^{s_\beta} e(T_2, T_3)^{-c}$, $\tilde{R}_3 = e(g_1, T_3)^{s_\delta} e(ψ(w_1)g_1^{x_{ik}}, T_4)^{-s_\beta}$. If the challenge equation holds, signature check 163 outputs valid; otherwise, it outputs invalid.

Figure 7:
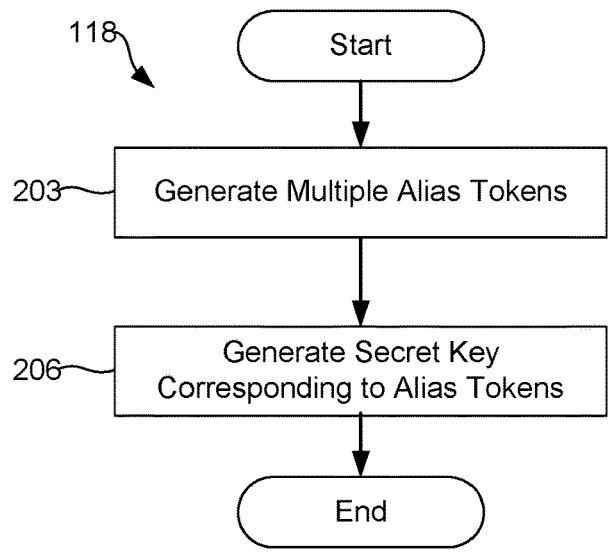
FIGS. 7-10 are example flowcharts illustrating functionality implemented by components of the networked environment, according to various examples described herein.

Moving to FIG. 7, shown is a flowchart illustrating one example of the join function 118. Starting in box 203, the join function 118 can generate multiple alias tokens 157. Each of the alias tokens 157 can have a predetermined number of bits, and can be divided into a number of segments. Each alias token segment can have a number of bits. The total number of segments multiplied by the number of bits in each alias token segment can be less than or equal to the predetermined number of bits in each of the alias tokens 157.

Next, in box 206, the join function 118 can generate the secret key 154 corresponding to the alias tokens 157. The secret key 154 and the alias tokens 157 can be generated by the group management system 103 and sent to the computing environment 106, or in some embodiments, they can be generated in conjunction with the computing environment 106. The join function 118 can further generate the revocation token 137 and add an entry for the signer corresponding to the computing environment 106 in the registration list 134. Thereafter, the join function 118 can end.

Figure 8:
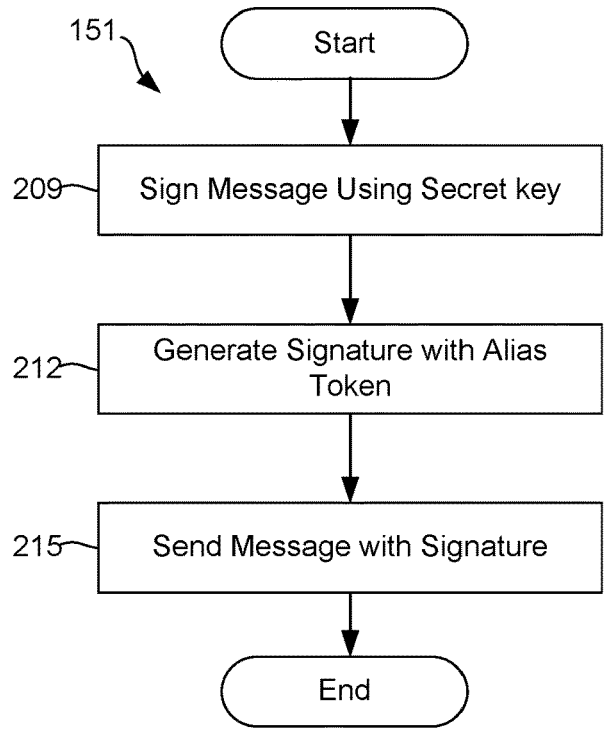

Now considering FIG. 8, shown is a flowchart illustrating one example of the sign function 151. The computing environment 106 can perform the sign function 151. Starting in box 209, the sign function 151 can sign a message using the secret key 154. Moving to box 212, the sign function 151 can generate a signature with one of the alias tokens 157. In some embodiments, the alias token 157 can be chosen based on a predetermined time interval. After the predetermined time interval, the alias token 157 corresponding to that time period can be discarded. Generating the signature having the alias token 157 can also include generating part of the signature using the Fiat-Shamir heuristic method.

Moving to box 215, the sign function 151 can send the message with the signature having the alias token 157 to a verifier. For example, the computing environment 106 can send the message with the signature having the alias token 157 to the computing environment 109 for verification. In some cases the message can be sent in response to a request from the computing environment 109 or functionality executed by the computing environment 109. The message can include any information that may be communicated between a signer and a verifier. Thus, the message can be used where PPA is used, including by applications or device-to-device communications.

Figure 9:
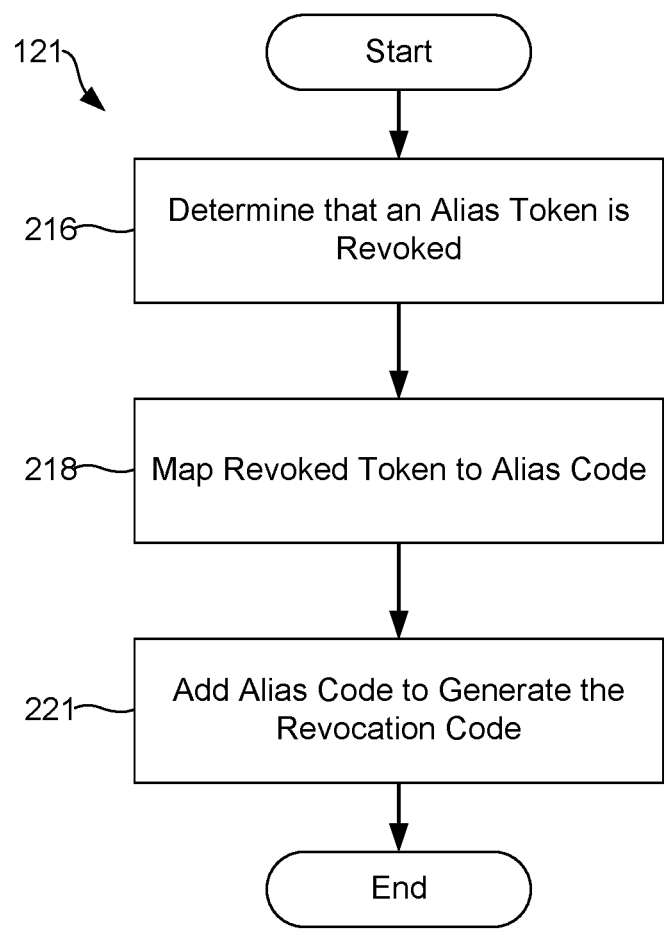

With reference to FIG. 9, shown is a flowchart illustrating one example of the revoke function 121. The revoke function can be performed by the group management system 103. Starting in box 216, the revoke function 121 can determine that an alias token 157 is revoked. The revoke function 121 can determine that an alias token 157 is revoked in response to determining that the alias token 157 is compromised, or that the alias token 157 is expired. In some embodiments, the revoke function 121 can received data indicating that the alias token 157 is expired, compromised, or otherwise revocable.

Next, in box 218, the revoke function 121 can map the revoked alias token 157 to the corresponding alias code 167. The alias token 157 can have a number of segments, each alias token segment having a number of bits. The corresponding alias code 167 can have the same number of orthogonal segments as the number of segments of the alias token 157. Each alias code can be a vector of +1s and −1s with desirable cross-correlation properties.

In box 221, the revoke function 121 can generate the revocation code 140 by adding the alias code 167 to an existing set of revoked alias codes in the revocation code 140. Where there are no existing revoked alias codes, the alias code 167 can be the revocation code 140. Thereafter the revoke function 121 can end. The revocation code 140 can be considered public information for revocation checks and verification, and can be stored and made available using the group management system 103 or otherwise.

Figure 10:
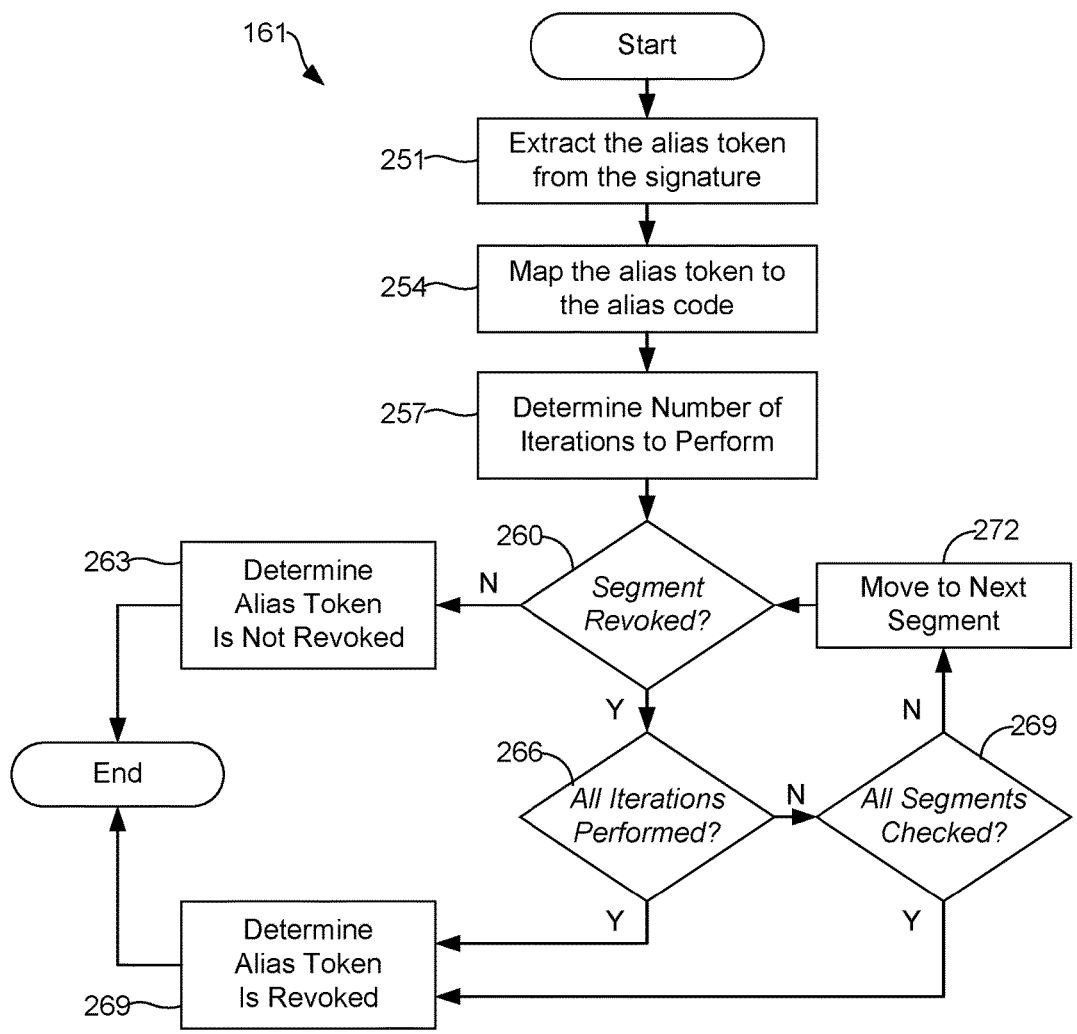

FIG. 10 shows a flowchart illustrating one example of the revocation check 161. The revocation check 161 can be performed by the computing environment 109 as part of a verification procedure. Starting in box 251, the revocation check 161 can extract the alias token 157 from the signature. The signature can be received by the computing environment 109 along with a message from the computing environment 106. The alias token 157 can be used to validate the signature. In some embodiments the signature can be a tuple, and the alias token 157 can be an element in the tuple. In other embodiments, the alias token can be otherwise included with or embedded in the signature. Once the alias token 157 is obtained or extracted from the signature, the revocation check 161 proceeds to box 254.

Next, in box 254, the revocation check 161 maps the alias token 157 to the alias code 167. The alias code 167 can be a column vector having elements that can each be positive one (+1) or negative one (−1). The alias token 157 can be divided into multiple segments, and an orthogonal code can be generated corresponding to each segment of the alias token 157. Each orthogonal code can be retrieved using the alias token segment as an index. These orthogonal codes can be concatenated to form the complete alias code, which can be referred to as a piecewise-orthogonal code, meaning each segment of the alias code can be an orthogonal code. In some cases a set of orthogonal codes can be generated or received for this purpose, for example, a set of orthogonal codes can be received from the group management system 103 or a public source.

For example, the alias token 157 can be the four-bit token {1101}. The four-bit token {1101} can be divided into two alias token segments, {11} and {01}, each segment being two bits. An orthogonal code of positive ones (+1s) and negative ones (−1s) can correspond to each two-bit alias token segment. For example, a first alias token segment {11} of the alias token 157 can correspond to {[+1][−1][−1][+1]} and its second alias token segment {01} can correspond to {[+1][−1][+1][−1]}. In some cases, a set of orthogonal codes can be generated having at least two orthogonal codes for each bit of the alias token segment, here $2^2=4$ orthogonal codes in the set, such that the alias token segment can be any of {00}, {01}, {10}, or {11}, and be mapped to a orthogonal code in the set. Note that where multiple alias tokens are considered, each alias token (here the four bit alias token) can be unique. However, each alias token segment is not necessarily unique. For example, another alias token {1111}, unique from the four-bit token {1101}, can share similar alias token segments. Each contains the two-bit segment {11}.

Thus {[+1][−1][−1][+1]} is a first alias code segment of the alias code 167 corresponding to the first alias token segment {11}, and {[+1][−1][+1][−1]} is a second alias code segment of the alias code 167 corresponding to the second alias token segment 01. The complete alias code 167 corresponding to the alias token can be formed by concatenating these alias code segments into a piecewise-orthogonal code {[+1][−1][−1][+1][+1][−1][+1][−1]}. After the alias token 157 and/or alias token segments of the alias token 157 are mapped to corresponding alias codes, the revocation check 161 can move to box 257.

In box 257, the revocation check 161 determines a number of iterations to perform. The number of iterations can be set by a group manager, or calculated based on certain factors. For example, each iteration will take some computation to perform, so the number of iterations can be chosen based on a desired level of computational overhead, or a desired computation or processing time. Each iteration can result in a false positive revocation of the alias token but cannot result in a false negative revocation of the alias token. Stated another way, each iteration can result in a certain determination that the alias code is not revoked (e.g. because there are no false negatives), or an uncertain determination that the alias code is revoked (e.g. because false positives are possible). Each iteration increases the confidence in the result of the revocation check 161. This iteratively decreases the probability of false positives of the revocation check 161. Thus, the number of iterations can also be chosen or determined based on a desired probability of false positives. The probability of false positive or probability of false alarm can be can be calculated based at least in part on the number of revoked private keys, the number of bits in each alias token segment, and the number of iterations performed.

If the verifier runs the revocation check 161 for a iterations, then the length of the alias code that has to be processed can be $l_r = a \cdot 2^{b_s}$, and probability of false alarm can be $P_{fa} \approx n_t^{l_r n_r / mn_r}$. Note that in this case the computational overhead of the revocation check 161 can be directly proportional to length of an alias code. There is a tradeoff between probability of false alarm and the computational cost of the revocation check 161. One possible strategy is to construct the revocation code 140 in such a manner that minimizes probability of false alarm for a given length of the alias and for a given number of revoked alias tokens (i.e., $mn_r$) by selecting an optimal number of bits in an alias token segment $b_s$. Once the optimal value of $b_s$ is computed, the ratio $n_t$ of the number of revoked alias tokens and the length of one segment of the revocation code can be computed by $n_t = mn_r / 2^{b_s}$. This value can be readily derived as $n_t = \exp(-1) \approx 0.3679$. However, $mn_r$ and $2^{b_s}$ are both integer values, and hence to minimize $P_{fa}$, the group manager can select $b_s$ such that $$\frac{\exp(-1)}{2} \leq \frac{mn_r}{2^{b_s}} < 3\exp(-1)/2.$$

In the present example, the group manager can select two iterations, and the revocation check 161 can move to box 260.

In box 260, the revocation check 161 can probabilistically determine whether a segment of the alias code 167 is revoked. Sometimes the alias code 167 can have a single segment. To continue the example, the alias code 167 can be the piecewise-orthogonal code $\{[+1][-1][-1][+1][+1][-1][+1][-1]\}$. The alias code has two orthogonal alias code segments, $\{[+1][-1][-1][+1]\}$ and $\{[+1][-1][+1][-1]\}$. The revocation check 161 can cross correlate a first alias code segment with a corresponding segment of the revocation code 140. The segments can be considered in any order.

Because the revocation code 140 is a number of alias codes added together, the revocation code 140 can have the same number of segments and the same segment lengths as each alias code 167. Further, each segment of the revocation code 140 corresponds to each segment of the alias code 167. In this example, two alias tokens, {1111}, and {1010}, are determined to be revoked. The revoked alias token {1111} can be mapped to a first revoked alias code $\{[+1][-1][-1][+1][+1][-1][-1][+1]\}$. The revoked alias token {1010} can be mapped to $\{[+1][+1][-1][-1][+1][+1][-1][-1]\}$. These alias codes can be added to form the revocation code 140, which is $\{[+2][0][-2][0][+2][0][-2][0]\}$. Each orthogonal segment of each alias code corresponds to a segment of the revocation code 140. For example, the first four elements of the first revoked alias code, $\{[+1][-1][-1][+1]\}$, corresponds to the first four elements of the revocation code 140, $\{[+2][0][-2][0]\}$.

Generally, the operation of the revocation check 161 proceeds to box 263 if the segment of the alias code is calculated as not revoked. If the segment is calculated as revoked, the revocation check 161 proceeds to box 266. To continue the example, if the first alias code segment $\{[+1][-1][-1][+1]\}$ of the alias code 167 can be cross-correlated with the corresponding revocation code segment $\{[+2][0][-2][0]\}$ of the revocation code 140. The result of this cross-correlation is 1, indicating that the segment is revoked, and the revocation check 161 would proceed to box 266. This is an example of a false positive or false alarm, as the alias code 167 was not actually used in forming the revocation code 140.

In box 263, the revocation check 161 determines that the alias token 157 corresponding to the alias code 167 is not revoked and can end with a valid authentication. Because GSPR does not result in a false negative result for alias code segments, if an alias code segment is calculated as not revoked in box 260, the revocation check 161 can immediately determine that an alias token is not revoked, and the result of authentication is valid.

In box 266, the revocation check 161 can determines whether all iterations are performed. Generally, if all iterations are performed, the revocation check 161 proceeds to box 269, where the revocation check 161 determines that the alias token 157 is revoked, resulting in an invalid authentication. In this example, if the number of iterations determined in box 257 is one iteration, then the revocation check 161 would move to box 269. In this example, the result is a false positive invalid authentication.

If all iterations are not performed, the revocation check 161 proceeds to box 269. In the present example, the number of iterations is set to two, so the revocation check 161 proceeds to box 269 and determines whether all segments of the alias code 167 have been checked. If all segments have been checked, the revocation check 161 proceeds to box 269 where the revocation check 161 determines that the alias token 157 is revoked. If all segments are not checked, revocation check 161 proceeds to box 272.

In box 272, the revocation check 161 moves to the next alias code segment. The next alias code segment can be the any alias code segment of the alias code 167 that has not yet been checked. This action can include incrementing a counter. It can also include selecting the next alias code sequentially, according to a predetermined order, or according to a random or pseudo-random selection. In the present example, the only remaining alias code segment of the alias code 167 is $\{[+1][-1][+1][-1]\}$. Once the next alias code segment is selected, the revocation check 161 proceeds again to box 260.

In this example, the second alias code segment $\{[+1][-1][+1][-1]\}$ of the alias code 167 can be cross-correlated with the corresponding revocation code segment $\{[+2][0][-2][0]\}$ of the revocation code 140. This time, the result of the cross-correlation is 0, indicating that the segment is not revoked. As discussed earlier, since GSPR results in no false positives, the revocation check 161 can determine that the alias token 157 is not revoked, and the result of authentication is valid. Thereafter, the revocation check can end.

The above-described examples of the present disclosure are merely possible examples of implementations set forth for a clear understanding of the principles of the disclosure. Many variations and modifications can be made without departing substantially from the spirit and principles of the disclosure.

A number of software components are stored in the data stores 115, 148, and 158, or otherwise in a respective memory and are executable by a respective processor of each of the group management system 106 and computing environments 106 and 109. In this respect, the term "executable" means that a program file, function, application, algorithm, or instructions are in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory can include both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. A local interface may comprise additional systems designed to coordinate this communication, including, for example, performing load balancing. The processor may be of electrical or of some other available construction.

Although the join function 118, the revoke function 121, the sign function 151, the revocation check 161, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7-10 show the functionality and operation of an implementation of portions of the various functions described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 7-10 show a specific order of execution, it is understood that the order of execution may differ from that which is depicted. For example, the order of execution of two or more blocks may be scrambled relative to the order shown. Also, two or more blocks shown in succession in FIGS. 7-10 may be executed concurrently or with partial concurrence. Further, in some embodiments, one or more of the blocks shown in FIGS. 7-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any function or application described herein that comprises software or code can be embodied in any non-transitory computer-readable medium for use by or in connection with an instruction execution system such as, for example, a processor in a computer system or other system. In this sense, the software may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In addition to the examples provided above, further examples utilizing group signatures with probabilistic revocation can be performed, for example, using the group management system 103 and the computing environments 106 and 109 or other computing devices. Such further examples are discussed below.

Group signatures (GSs) is an elegant approach for providing privacy-preserving authentication. Unfortunately, modern GS schemes have limited practical value for use in large networks due to the high computational complexity of their revocation check procedures. Described herein is a GS scheme called the Group Signatures with Probabilistic Revocation (GSPR), which significantly improves scalability with regard to revocation. GSPR employs the notion of probabilistic revocation, which enables the verifier to check the revocation status of the private key of a given signature efficiently. However, GSPR's revocation check procedure produces probabilistic results, which may include false positive results but no false negative results. GSPR includes a procedure that can be used to iteratively decrease the probability of false positives. GSPR makes an advantageous tradeoff between computational complexity and communication overhead, resulting in a GS scheme that offers a number of practical advantages over the prior art. Provided is a proof of security for GSPR in the random oracle model using the decisional linear assumption and the bilinear strong Diffie-Hellman assumption.

1. As an Introduction

The notion of authentication is to enable a sender to prove her identity to a distant communication partner and/or to show that she is the origin of the transmitted data. This security attribute is beneficial to most of today's applications that rely on digital communications over insecure networks. In some applications, however, authentication is not sufficient, and in addition to authentication, the sender's privacy should be protected—the combination of these two attributes is often referred to as privacy-preserving authentication (PPA). PPA schemes are desirable in applications where the verifiers should not learn the actual identity of the sender (i.e., signer), and are willing to accept an authentication artifact (i.e., signature) that is verifiably linked to an anonymous sender, knowing that the sender's identity can be revealed by a trusted third party, if disputes need to be resolved. A wide variety of applications use PPA, including safety applications for vehicular networks, identity escrow schemes, anonymous credential systems, remote attestation of computing platforms, and device-to-device communications in the Internet-of-Things (IoT) paradigm.

For deployment in large networks, PPA protocols can rely on public-key cryptography. In public-key cryptosystem-based PPA protocols, there are three entities that interact with each other: signer, verifier, and group manager. The roles of the signer and the verifier are obvious. The group manager plays an important role. During the initialization process, the group manager generates parameters, and certificates (e.g., public-key certificates) and the private signing key of each group member. Most importantly, the group manager has the ability to reveal the signer's true identity if a dispute needs to be resolved. PPA schemes can be broadly categorized into two approaches: pseudonym-based signatures (PSs) and group signatures (GSs).

In PSs, legacy public-key cryptosystems (e.g., RSA) are used. The group manager provides the signer with a list of pseudonyms and the corresponding private keys, public keys, and public-key certificates. The signer creates a signature based on her pseudonym, and replaces her pseudonym with a new one periodically to preserve anonymity. Although the PS approach is straightforward, it has a number of drawbacks. Because each pseudonym should be used with its unique set of private and public keys and a certificate, key management and distribution become an onerous burden in large networks.

GSs do not use public-key certificates, and hence do not need a certificate distribution framework. In GS, each signer is a member of a group, and she is provided with a private key tuple by the group manager. Using this tuple, the signer generates signatures without revealing her true identity to the verifier. In the case of a conflict, the signature can be "opened" by the group manager, and the identity of the signer is revealed. The most practical GS schemes support verifier-local revocation (VLR). To perform VLR, the group manager generates a revocation token for each signer (which is a portion of the private key), publishes it in a revocation list, and distributes the revocation list to the verifiers. To check the revocation status of the private key used to generate the received signature, the verifier performs the revocation check procedure. This procedure involves going through the revocation list, and checking whether any of the revocation tokens contained therein can be mapped to the received signature. This means that the computation time for the revocation check procedure increases linearly with the number of revoked private keys. Moreover, the computational cost of the procedure for each revocation token is expensive. After a thorough and comprehensive analysis of existing GSs, it was recently concluded that revocation remains the major performance bottleneck of modern GS schemes, and that further research can result in design schemes offering better scalability with regard to revocation.

As described herein, a VLR GS scheme called Group Signatures with Probabilistic Revocation (GSPR) is proposed. As its name implies, the most striking attribute of GSPR is that it supports probabilistic revocation. That is, GSPR's revocation check procedure does not produce deterministic results, but instead produces probabilistic results, which may include false positive (i.e., false alarm) results but no false negative results. Here, a false negative result refers to an instance in which the revocation check algorithm fails to detect that the revocation token associated with the received signature is included in the revocation list. GSPR includes a procedure that can be used to iteratively decrease the probability of false alarms. The use of probabilistic revocation (instead of deterministic revocation) enables GSPR to elegantly address the primary performance bottleneck of GSs—i.e., enable efficient revocation checking with only a modest increase in the signature size. In fact, GSPR's revocation check time does not grow linearly with the number of revoked keys.

The dramatic improvement in the computational efficiency of the revocation check procedure is made possible by the use of "alias codes". Each alias code is a vector of +1s and −1s with desirable cross-correlation properties, and each alias code is mapped to an "alias token" (which is equivalent to a revocation token in legacy VLR GS schemes) included in each signature. The group manager creates a "revocation code" (which is equivalent to a revocation list) by adding all of the alias codes mapped to revoked alias tokens, and then distributes this to the verifiers. The verifier performs the revocation check procedure by first mapping the signature's alias token to an alias code, and then computing the cross correlation of the alias code and the revocation code. Note that the verifier is able to check whether a particular alias code is included in the revocation code in a cross-correlation operation, and thus avoids the burden of legacy GS schemes in which the verifier iteratively checks each revocation token in the revocation list. Because of the probabilistic nature of the revocation check procedure, its result is not guaranteed to be correct with certainty, but only with a certain probability.

The paper's main contributions are summarized below.
A VLR GS scheme called Group Signatures with Probabilistic Revocation significantly reduces the computational complexity of the revocation check procedure compared to the prior art.
The concept of probabilistic revocation described herein makes an advantageous tradeoff between computational complexity and communication overhead. This tradeoff enables GSPR to have significantly better scalability in terms of revocation compared to the prior art.

Also provided herein is a security analysis of GSPR in the random oracle model using standard complexity assumptions often used in evaluating legacy schemes.

The rest of this paper is organized as follows. Security assumptions are provided in Section 2, and present the model and security definitions in Section 3. Details of GSPR are provided in Section 4, and analyze its security properties in Section 5. A computational and communication overhead analysis of GSPR is provided in Section 6. GSPR is discussed in the context of safety applications for vehicular networks in Section 7.

2. Preliminaries

The proposed scheme is constructed in cyclic groups with a computable bilinear map. Moreover, the security of the proposed scheme is proved in the random oracle model using the Decisional Linear (DLIN) assumption and the q-Bilinear Strong Diffie-Hellman (BSDH) assumption. This section includes an example review of definitions of bilinear groups and of complexity assumptions.

Definition 1 (Bilinear Groups): ($\mathbb{G}_1$, $\mathbb{G}_2$) is called a bilinear group pair, if there exists a group $\mathbb{G}_T$ and a bilinear map e: $\mathbb{G}_1 \times \mathbb{G}_2 \to \mathbb{G}_T$ with the following properties:

1. $\mathbb{G}_1$, $\mathbb{G}_2$ and $\mathbb{G}_T$ are multiplicative cyclic groups of prime order p;
2. $g_1$ is a generator of $\mathbb{G}_1$, and $g_2$ is a generator of $\mathbb{G}_2$;
3. $\psi$ is an efficiently computable isomorphism from $\mathbb{G}_2$ to $\mathbb{G}_1$, with $\psi(g_2)=g_1$;
4. e is an efficiently computable bilinear map with the following properties:
  Bilinear: $e(u^a, v^b)=e(u, v)^{ab}$, $\forall u \in \mathbb{G}_1$, $v \in \mathbb{G}_2$ and a, b $\in \mathbb{Z}^*_p$, where $\mathbb{Z}^*_p$ represents the set of integers modulo p; and
  Non-degenerate: $e(g_1, g_2) \neq 1$.

When $\mathbb{G}_1 = \mathbb{G}_2$, $\psi$ is an identity map. On the other hand, when $\mathbb{G}_1 \neq \mathbb{G}_2$, certain families of non-supersingular elliptic curves can be used for efficient implementation of bilinear groups, and $\psi$ can be implemented by a trace map.

Definition 2 (DLIN Assumption): Given $u_0, u_1, h, u_0^a, u_1^b$, $Z \in \mathbb{G}_2$, where a, b $\in \mathbb{Z}^*_p$, as input for each probabilistic polynomial time (PPT) algorithm $\mathcal{A}$, the probability with which $\mathcal{A}$ is able to differentiate whether $$Z = h^{a+b} \text{ or } Z \xleftarrow{R} \mathbb{G}_2$$

is negligibly small. Here, $$\xleftarrow{R}$$

represents a random selection.

Definition 3 (BSDH Assumption): Given a (q+2)-tuple $(g_1, g_2, g_2^\gamma, \ldots, g_2^{\gamma^q})$ as input for each PPT algorithm $\mathcal{A}$, the probability that $\mathcal{A}$ outputs a pair $(e(g_1, g_2)^{1/(\gamma+x)}, x)$, where $x \in \mathbb{Z}^*_p$, $$g_2 \xleftarrow{R} \mathbb{G}_2, g_1 = \psi(g_2),$$

and $$\gamma \xleftarrow{R} \mathbb{Z}^*_p,$$

is negligibly small.

3. Model and Security Definitions

This section describes example algorithms that can make up GSPR, and review the security properties of GSs.

Definition 4 (Group Signatures with Probabilistic Revocation): It is composed of the following algorithms, which can, for example, be performed or utilized by the group management system 103, the computing environments 106, or the computing environment 109.

KeyGen($\lambda$): With the security parameter, $\lambda \in \mathbb{N}$, this algorithm generates a group public key gpk, and a group manager's secret gms. Here, $\mathbb{N}$ represents the set of natural numbers.

Join(gms, i, m): To add the signer i $\in [1, n]$, where n is the total number of signers in the network, as a member of the group with the secret gms, this algorithm generates a set of m alias tokens, $x_{ik}$, $\forall k \in [1, m]$, a corresponding secret/private key $gsk_i$ and a corresponding revocation token $grt_i$, and makes an entry into a registration list $reg_i$. The terms "secret key" and "private key" can be used interchangeably.

Sign(gpk, $gsk_i$, M): With the group public key gpk, and the signer's secret key $gsk_i$, this algorithm generates signature $\sigma$ with alias token $x_{ik}$ on message M.

Verify(gpk, RC, $\sigma$, M): If both of the following sub-algorithms produce an output value of valid, this algorithm outputs the value valid; otherwise, it outputs the value invalid.

SignCheck(gpk, $\sigma$, M): With the group public key gpk and a purported signature $\sigma$ on a message M, this sub-algorithm outputs the value valid if $\sigma$ is an honest signature on M; otherwise, it outputs the value invalid.

RevCheck(RC, $\sigma$): With a revocation code RC and a purported signature $\sigma$, this sub-algorithm outputs the value valid if the alias token $x_{ik}$ embedded in $\sigma$ is determined to be unrevoked; otherwise, it outputs the value invalid.

Revoke($grt_i$, RC): This algorithm updates the revocation code RC using the revocation token $grt_i$ if the membership of signer i is to be revoked. Here, revoking the membership of the signer is equivalent to revoking her private key and revoking all of her alias tokens.

Open(reg, $\sigma$, M): Given a valid signature $\sigma$ on a message M, created by a signer i $\in [1, n]$, this algorithm outputs the signer's identity i.

The group manager can run KeyGen to set-up the group, Join to add a signer to the group, Revoke to revoke a private key of a signer, and Open to open a signature. The signer runs Sign to sign a message, and the verifier runs Verify to verify a signed message.

Three attributes of GSs are described in the following discussion.

Correctness: This ensures the following properties.
  Signature Correctness: This ensures that if a signature is generated by an honest signer, the signature check algorithm (i.e., SignCheck) outputs the value valid.
  Identity Correctness: This ensures that if a signature is generated by an honest signer, the group manager correctly reveals the identity of the signer using the signature open algorithm (i.e., Open).

Revocation Correctness: This ensures that if a signature is generated by an honest signer using an unrevoked private key, the revocation check algorithm (i.e., RevCheck) outputs the value valid.

Anonymity: This property ensures that no party except the group manager is able to identify the signer of a given signature.

Traceability: This property indicates that no colluding set of signers (even consisting of the entire group) can create signatures that cannot be traced back to a signer in the group, or signatures that cannot be traced back to some member of the colluding set.

The revocation correctness property is not considered a core security property in most GSs. However, it is an important property to consider in evaluating GSPR, with respect to other GS schemes. GSPR satisfies all of the security properties listed above with the exception of the revocation correctness property. One of the intrinsic attributes of GSPR that distinguishes it from all other GSs is that it satisfies the revocation correctness property with a certain probability, but not with certainty. GSPR exploits the computational efficiency advantage of probabilistic algorithm to significantly reduce the computation cost of the revocation check procedure. Below, provided are example definitions of the security properties mentioned above.

Definition 5 (Signature Correctness): It indicates that for all $\lambda$, $n \in \mathbb{N}$, all (gpk, gms) obtained by KeyGen, all (g $sk_i$, $grt_i$, $reg_i$) obtained by Join for any $i \in [1, n]$, and all $M \in \{0, 1\}^*$, SignCheck(gpk,Sign(gpk,$gsk_i$,$M$),$M$)=valid.

Definition 6 (Identity Correctness): It indicates that for all $\lambda$, $n \in \mathbb{N}$, all (gpk, gms) obtained by KeyGen, all ($gsk_i$, $grt_i$, $reg_i$) obtained by Join for any $i \in [1, n]$, and all $M \in \{0, 1\}^*$, Open(reg,Sign(gpk,$gsk_i$,$M$),$M$)=i.

Definition 7 (Revocation Correctness): It indicates that for all $\lambda$, $n \in \mathbb{N}$, all (gpk, gms) obtained by KeyGen, all ($gsk_i$, $grt_i$, $reg_i$) obtained by Join for any $i \in [1, n]$, and all $M \in \{0, 1\}^*$, RevCheck(RC,Sign(gpk,$gsk_i$,$M$))=valid, implies that the private key of the signer i is not revoked.

Definition 8 (Anonymity): It indicates that for each PPT algorithm $\mathcal{A}$, the advantage of $\mathcal{A}$ on winning the following game is negligibly small.

Setup: The challenger runs KeyGen($\lambda$) and Join(gms, i, m), $\forall i \in [1, n]$. He obtains gpk, gsk, and reg. He provides the algorithm $\mathcal{A}$ with gpk.

Queries-Phase I: $\mathcal{A}$ queries the challenger about the following.
  a. Signing: $\mathcal{A}$ requests a signature on an arbitrary message M for an arbitrary member i. The challenger responds with the corresponding signature.
  b. Corruption: $\mathcal{A}$ requests the secret key of an arbitrary member i. The challenger responds with the key $gsk_i$.
  c. Opening: $\mathcal{A}$ requests the identity of the signer by providing a message M and its valid signature $\sigma$ created by signer $i \in [1, n]$. The challenger responds with the signer's identity i.

Challenge: $\mathcal{A}$ outputs a message M and two members $i_0$ and $i_1$ with the restriction that the corruption of $i_0$ and $i_1$ have not been requested. The challenger chooses $\phi \xleftarrow{R} \{0, 1\}$, and responds with the signature $\sigma^*$ on $M^*$ of member $i_\phi$.

Queries-Phase II (Restricted Queries): After obtaining the challenge, $\mathcal{A}$ can make additional queries of signing, corruption and opening, except the corruption queries of $i_0$ and $i_1$, and the opening query of the signature $\sigma^*$ on $M^*$.

Output: $\mathcal{A}$ outputs a bit $\phi'$ indicating its guess of $\phi$. $\mathcal{A}$ wins the anonymity game if $\phi'=\phi$. The advantage of $\mathcal{A}$ is defined as $|\Pr(\phi'=\phi)-\frac{1}{2}|$.

Definition 9 (Traceability): It indicates that for each PPT algorithm $\mathcal{A}$, the probability that $\mathcal{A}$ wins the following game is negligibly small.

Setup: The challenger runs KeyGen($\lambda$) and Join(gms, i, m), $\forall i \in [1, n]$. He obtains gpk gsk, and reg. He provides $\mathcal{A}$ with gpk, and sets U as empty.

Queries: $\mathcal{A}$ queries the challenger about the following.
  d. Signing: $\mathcal{A}$ requests a signature on an arbitrary message M for an arbitrary member i. The challenger responds with the corresponding signature.
  e. Corruption: $\mathcal{A}$ requests the secret key of an arbitrary member i. The challenger adds i to U, and responds with the key $gsk_i$.

Output: $\mathcal{A}$ outputs a message $M^*$ and a signature $\sigma^*$. $\mathcal{A}$ wins the game if:
1. SignCheck(gpk, $\sigma^*$, $M^*$)=valid;
2. $\sigma^*$ is traced to a member outside of U or the trace is failure; and
3. $\mathcal{A}$ did not obtain $\sigma^*$ by making a signing query on $M^*$.

4. Proposed Scheme: GSPR 4.1 Motivation for Probabilistic Revocation

In the GSs supporting VLR, the group manager includes a revocation token corresponding to each revoked private key in a revocation list, and distributes the revocation list to the verifier. In each VLR based GS scheme, there is an associated implicit tracing algorithm which utilizes the revocation token to link a signature to a revoked private key using which the signature is generated. This implicit algorithm uses several exponentiation and/or bilinear map operations which are computationally expensive. In the revocation check procedure, the verifier performs this implicit tracing algorithm between the received signature, and each revocation token in the revocation list. This means that the computation time for the revocation check procedure of a signature increases linearly with the number of revoked private keys. Hence, the revocation check procedure becomes the major bottleneck in the application of VLR based GSs in real systems with large number of signers along with possibility of large number revoked private keys.

As described herein, proposed is a VLR based GS, called Group Signatures with Probabilistic Revocation (GSPR), in which an alias token is embedded into the group signature generated by a signer in such a way that it can be utilized for the purpose of revocation check procedure. GSPR significantly reduces the computation complexity of the revocation check procedure by adopting two techniques. Firstly, it reduces the computation cost of executing the implicit tracing algorithm by using the alias tokens in generating signatures. Secondly, it enables the verifier to check the revocation status of an alias token in a single step, instead of requiring the verifier to sequentially go through the revocation list and execute the implicit tracing algorithm for each revocation token included in the revocation list.

Specifically, the group manager issues a set of alias tokens corresponding to a private key of the signer, and the signer embeds an alias token in each of its generated signatures. When the private key of the signer is revoked, all its corresponding alias tokens are added to a revocation list. Further, each alias token is mapped to an "alias code". The group manager performs sample-by-sample addition of all the alias codes corresponding to the alias tokens in the revocation list to generate one code called the "revocation code". The revocation code, instead of the revocation list, is provided to the verifier. When the verifier receives a particular signature with a particular alias token, he generates the alias code corresponding to the alias token. The verifier computes the cross correlation of the alias code and the revocation code. If the value of correlation exceeds a particular threshold, the verifier presumes that the alias code (of the signature being verified) is used to generate the revocation code, and in turn concludes that the signature is invalid because it is associated with a revoked alias token. Otherwise, the verifier concludes that the signature is valid.

The motivation for using alias codes comes from direct-sequence spread spectrum (DSSS) systems used in communications. DSSS is a modulation technique that enables the receiver to remove undue interference and recover the correct information from an aggregate of multiple signals even when multiple transmitters send information simultaneously over a single channel. Information recovery is made possible with the use of specially-crafted spreading codes.

4.2 Technical Details

For a given security parameter $\lambda \in \mathbb{N}$, consider a bilinear group pair $(\mathbb{G}_1, \mathbb{G}_2)$ with isomorphism $\psi$. Consider $H_z: \{0,1\}^* \to \mathbb{Z}^*_p$ and $H_g: \{0,1\}^* \to \mathbb{G}_2^2$ as collision resistant hash functions treated as random oracles. Consider a set of alias codes, $\mathbb{C}_p$. The order of $\mathbb{C}_p$ is p which is equal to the order of $\mathbb{Z}^*_p$. Each element in $v_p$ is an alias code which is a vector of +1s and −1s of length l. Further, a mapping function can be $F_c: \mathbb{Z}^*_p \to \mathbb{C}_p$ using which an alias token in $\mathbb{Z}^*_p$ can be mapped to an alias code in $\mathbb{C}_p$. The details of $\mathbb{C}_p$ and $F_c$ are discussed in Section 5.4.1. $\mathbb{G}_1$, $\mathbb{G}_2$, $\psi$, $H_z$, $H_g$, $\mathbb{C}_p$ and $F_c$ are considered public knowledge. In the following paragraphs, defined are example algorithms that make up GSPR. These algorithms can refer to software or functionalities which can, for example, be performed or utilized by the group management system 103, the computing environments 106, or the computing environment 109.

KeyGen($\lambda$): With the security parameter $\lambda \in \mathbb{N}$, this algorithm generates the group public key gpk and the group manager's secret gms through the following steps.

1. Select a generator $$g_2 \xleftarrow{R} \mathbb{G}_2,$$

and set $g_1 = \psi(g_2)$ such that $g_1$ is a generator of $\mathbb{G}_1$.

2. Select $$\gamma \xleftarrow{R} \mathbb{Z}^*_p,$$

and compute $w_k = g_2^{\gamma^k}$, $\forall k \in [0, m]$. Note that $w_0 = g_2$.

The group public key is gpk=$(g_1, g_2, w_1, w_2, \ldots w_m)$. The secret belonging only to the group manager is given by gms=$\gamma$. The output of this algorithm is (gpk, gms).

Join(gms, i, m): This algorithm adds the signer i as a member of the group with the group manager's secret gms, and generates m alias tokens for signer i, and a corresponding secret key $gsk_i$. This algorithm also generates a revocation token $grt_i$ for signer i, and an entry in the registration list re $g_i$ using the following steps.

1. Select $$\gamma_i \xleftarrow{R} \mathbb{Z}^*_p.$$

2. Compute the set of m alias tokens, $$X_i = \{x_{ik} : x_{ik} = H_z(y_i, k), \forall k \in [1, m]\}, \quad (1)$$

where $k^{th}$ alias token of signer i is represented by $x_{ik}$.

3. Compute $\pi_i = \Pi_{k=1}^{m} (\gamma + x_{ik})$, and calculate $$A_i = g_1^{1/\pi_i}. \quad (2)$$

In the unlikely case, if $\pi_i = 0$, restart from Step 1. For signer i, the secret key is $gsk_i = (A_i, y_i)$, the revocation token is $grt_i = X_i$, and the entry in the registration list is $reg_i = X_i$. Note that only the group manager has access to reg. The output of this algorithm is ($gsk_i$, $grt_i$, $reg_i$).

Sign(gpk, $gsk_i$, M):

The inputs to the signing algorithm are the group public key gpk, the signer's secret key $gsk_i$, and the message to be signed $M \in \{0, 1\}^*$. This algorithm generates a signature $\sigma$ on M using the following steps.

1. Generate the following parameters.
   (a) Compute the alias tokens $X_i$ using equation (1).
   (b) Define $\pi_i = \Pi_{k=1}^{m} (\gamma + x_{ik}) = \Sigma_{k=0}^{m} a_k \gamma^k$, where $a_0, a_1, \ldots, a_m \in \mathbb{Z}^*_p$ are the coefficients of the polynomial $\pi_i$ with the variable $\gamma$, and compute $$B_i = g_2^{\pi_i} = \Pi_{k=0}^{m} w_k^{a_k}. \quad (3)$$

(c) For each $x_{ik} \in X_i$, define $\pi_i/(\gamma + x_{ik}) = \Pi_{j=1, j \neq k}^{m} (\gamma + x_{ij}) = \Sigma_{j=0}^{m-1} b_j \gamma^j$, where $b_0, b_1, \ldots, b_{m-1} \in \mathbb{Z}^*_p$ are the coefficients, and compute $$C_{ik} = g_2^{\pi_i/(\gamma + x_{ik})} = \Pi_{j=0}^{m-1} w_j^{b_j}. \quad (4)$$

2. Select a tuple $(A_i, B_i, C_{ik}, x_{ik})$ by selecting some value of $k \in [1, m]$. The signer utilizes a particular k to sign all its signatures during some time interval. After this time interval, she discards the alias token. When the signer exhausts all its alias tokens, she runs the Join algorithm again to fetch new secret key, and computes corresponding set of new alias tokens.

3. Compute $(\hat{u}, \hat{v}) = H_g(gpk, M, x_{ik})$, and calculate their images in $\mathbb{G}_1$, such that $u = \psi(\hat{u})$ and $v = \psi(\hat{v})$.

4. Select $\alpha$, $\beta$, $$\delta \xleftarrow{R} \mathbb{Z}^*_p,$$

and compute $T_1 = u^\alpha$, $T_2 = A_i v^\alpha$, $T_3 = B_i^\beta$, and $T_4 = C_{ik}^\delta$.

5. Compute the signature of knowledge (SPK) which is expressed as follows.

$$V = SPK\{(\alpha, \beta, \delta, x_{ik}, A_i, B_i, C_{ik}):$$

$$T_1 = u^\alpha, T_2 = A_i v^\alpha, T_3 = B_i^\beta T_4 = C_{ik}^\delta,$$

$$e(A_i, B_i) = e(g_1, g_2), e(g_1, B_1) = e(g_1^\gamma g_1^{x_{ik}}, C_{ik})\}(M)$$

$$= SPK\{(\alpha, \beta, \delta, x_{ik}, A_i, B_i, C_{ik}):$$

$$T_1 = u^\alpha, e(T_2, T_3) = e(v, T_3)^\alpha e(g_1, g_2)^\beta,$$

$$1 = e(g_1, T_3)^\delta e(\psi(w_1) g_1^{x_{ik}}, T_4)^{-\beta} \} (M). \quad (5)$$

This SPK is computed with the Fiat-Shamir heuristic method using the following steps.

(a) Select binding factors $$r_\alpha, r_\beta, r_\delta \xleftarrow{R} \mathbb{Z}_p^*,$$

and compute $$R_1 = u^{r_\alpha}, R_2 = e(v, T_3)^{r_\alpha} e(g_1, g_2)^{r_\beta},$$

$$R_3 = e(g_1, T_3)^{r_\delta} e(\psi(w_1) g_1^{x_{ik}}, T_4)^{-r_\beta}. \quad (6)$$

(b) Compute the challenge c as $$c = H_z(\text{gpk}, M, x_{ik}, T_1, T_2, T_3, T_4, R_1, R_2, R_3).$$

(c) Compute responses, $s_\alpha = r_\alpha + c\alpha$, $s_\beta = r_\beta + c\beta$, and $s_\delta = r_\delta + c\delta$.

The output of this algorithm is the signature $$\sigma = (x_{ik}, T_1, T_2, T_3, T_4, c, s_\alpha, s_\beta, s_\delta). \quad (7)$$

Verify(gpk, RC, $\sigma$, M): The verification algorithm takes as input the group public key gpk, the revocation code RC, the signature $\sigma$, and the message M. Using the following sub-algorithms, it verifies two things: (1) whether the signature was honestly generated, and (2) revocation status of the alias token used to generate the signature. If both the sub-algorithms output valid, this algorithm outputs valid; otherwise it outputs invalid.

SignCheck(gpk, $\sigma$, M): With the group public key gpk and a purported signature $\sigma$ on a message M, this sub-algorithm outputs valid if $\sigma$ is an honest signature on M. This is checked using the following steps.

1. Compute $(\hat{u}, \hat{v}) = H_g(\text{gpk}, M, x_{ik})$, and calculate their images in $\mathbb{G}_1$, i.e., $u = \psi(\hat{u})$ and $v = \psi(\hat{v})$.
2. Retrieve:

$$\tilde{R}_1 = u^{s_\alpha} T_1^{-c}, \tilde{R}_2 = e(v, T_3)^{s_\alpha} e(g_1, g_2)^{s_\beta} e(T_2, T_3)^{-c}$$

$$\tilde{R}_3 = e(g_1, T_3)^{s_\delta} e(\psi(w_1) g_1^{x_{ik}}, T_4)^{-s_\beta}. \quad (8)$$

3. Check the correctness of the challenge c as $$c \stackrel{?}{=} H_z(\text{gpk}, M, x_{ik}, T_1, T_2, T_3, T_4, \tilde{R}_1, \tilde{R}_2, \tilde{R}_3).$$

If the above equation holds, this sub-algorithm outputs valid; otherwise, it outputs invalid.

RevCheck(RC, $\sigma$): The inputs to the revocation check algorithm are the alias token $x_{ik}$ embedded in the signature $\sigma$, and the revocation code, RC. The purpose of this sub-algorithm is to check whether the alias token, $x_{ik}$, has been revoked or not, which is accomplished using the following steps.

1. Map $x_{ik}$ to the corresponding alias code $s_{ik}$, i.e., compute $s_{ik} = F_c(x_{ik})$, where $s_{ik}$ is a column vector of length l of samples of +1s and −1s.
2. Compute the value of the decision variable, $$z = \frac{1}{l} s_{ik}^T RC,$$

where $s_{ik}^T$ is the transpose of $s_{ik}$.

3. Output invalid if $z \geq \tau$, where $\tau$ is a pre-determined threshold; otherwise, output valid.

Revoke(grt$_i$, RC): The inputs to this algorithm are the revocation token of the signer, grt$_i$, and the current revocation code, RC. To revoke signer i, the group manager updates the revocation code using the following steps.

1. Map each $x_{ik} \in \text{grt}_i$ to the corresponding alias code $s_{ik}$, i.e., compute $s_{ik} = F_c(x_{ik})$ for k=1, 2 ... m.
2. Compute the code, $\bar{s}_i$, by adding all the unique alias codes corresponding to the revoked alias tokens such that $\bar{s}_i = \Sigma_{k=1}^m s_{ik}$.
3. Update the revocation code as RC = RC + $\bar{s}_i$.

Open(reg, $\sigma$, M): With the valid signature $\sigma$ on message M, the actual signer of the signature is identified using the following step.

4. Search the registration list reg to find signer i that has generated signature $\sigma$ with the alias token $x_{ik}$.
5. If a match is successfully found, output i; otherwise, output 0 to indicate a failure.

5. Security Analysis

5.1 Signature and Identity Correctness

It can be shown that GSPR satisfies the signature correctness and the identity correctness properties. Security proofs for these properties can be constructed.

5.2 Anonymity

THEOREM 1 In the random oracle model, suppose an algorithm $\mathcal{A}$ breaks the anonymity of GSPR with advantage $\varepsilon$ after $q_H$ hash queries and $q_S$ signing queries, then there exists an algorithm $\mathcal{B}$ that breaks the DLIN assumption with the advantage $(1/n^2 - q_S q_H/p)\varepsilon/2$.

This theorem prescribes that GSPR satisfies the anonymity property in the random oracle model when the DLIN assumption is presumed. One core technique used in the proof of anonymity is the randomness of $(\hat{u}, \hat{v})$ such that the challenger can backpatch the hash oracle. GSPR also preserves the randomness of $(\hat{u}, \hat{v})$. Hence, the same technique and the proof construction method can be employed to prove Theorem 1.

Note that within a time interval, the signer uses the same alias token to generate all the signatures, and hence those signatures can be linked to the same signer. However, the signer utilizes different alias tokens in different time intervals, and thus non-linkability is preserved between different time intervals. For many applications, the duration of each time interval is small (e.g., 1 minute in vehicular networks), resulting in only a few linkable signatures.

In GSPR, all of the previous signatures generated using a revoked private key can be linked together using the implicit tracing algorithm. Most other VLR schemes share this drawback. This drawback can be mitigated in a number of ways, including the use of time-stamped parameters or the use of accumulators. However, these methods incur additional overhead that may be unacceptable in many applications.

5.3 Traceability

A traceability property of GSPR is considered in Theorem 2, Lemma 1 can be utilized as a proof.

LEMMA 1 Suppose an algorithm $\mathcal{A}$ which is given an instance $(\tilde{g}_1, \tilde{g}_2, \tilde{g}_2^\gamma, \ldots, \tilde{g}_2^{\gamma^m})$ and n tuples $(\tilde{A}_i, x_{i1}, x_{i2}, \ldots x_{im})$, $\forall i \in [1, n]$, where $x_{ik} \in \mathbb{Z}_p^*$ $\forall i \in [1, n]$, $k \in [1, m]$, $\tilde{g}_2 \in \mathbb{G}_2$, $\tilde{g}_1 = \psi(\tilde{g}_2)$ and $\tilde{A}_i = \tilde{g}_1^{1/\Pi_{k=1}^m (\gamma + x_{ik})}$, forges a tuple $(\tilde{A}_*, \tilde{B}_*, \tilde{C}_*, x_*)$ for some $\tilde{A}_* \in \mathbb{G}_1$, $\tilde{B}_* \in \mathbb{G}_2$, $\tilde{C}_* \in \mathbb{G}_2$ and $x_* \neq x_{ik}$ $\forall i \in [1, n], k \in [1, m]$ such that $e(\tilde{A}_*, \tilde{B}_*) = e(\tilde{g}_1, \tilde{g}_2)$ and $e(\tilde{g}_1, \tilde{B}_*) = e(\tilde{g}_1^\gamma \tilde{g}_1^{x_*}, \tilde{C}_*)$, then there exists an algorithm $\mathcal{B}$ solving q-BSDH problem, where q=(n+1)m.

PROOF. Algorithm $\mathcal{B}$ is given a q-BSDH instance represented by $(g_1, w_0, w_1, \ldots, w_q)$, where $w_j = g_2^{\gamma^j} \forall j \in [0, q]$. $\mathcal{B}$ sets q=(n+1)m. The objective of $\mathcal{B}$ is to produce a BSDH pair $(e(g_1, g_2)^{1/(\gamma+d)}, d)$ for some $d \in \mathbb{Z}^*_p$. For this, $\mathcal{B}$ creates the following framework to interact with $\mathcal{A}$.

Setup: $\mathcal{B}$ does the following.

6. Select nm values:

$$x_{ik} \xleftarrow{R} \mathbb{Z}^*_p,$$

$\forall i \in [1, n], k \in [1, m]$.

7. Define $\pi_i = \Pi_{k=1}^m (\gamma + x_{ik})$, and $f(\gamma) = \Pi_{i=1}^n \pi_i = \Sigma_{j=0}^{nm} \alpha_j \gamma^j$, where $\alpha_0, \alpha_1, \ldots, \alpha_{nm} \in \mathbb{Z}^*_p$ are the coefficients of the polynomial f with variable $\gamma$.

8. Compute $\tilde{g}_2 = g_2^{f(\gamma)} = \Pi_{j=0}^{nm} w_j^{\alpha_j}$, and $\tilde{g}_1 = \psi(\tilde{g}_2)$.

9. Compute $\tilde{w}_k = \tilde{g}_2^{\gamma^k} = \Pi_{j=0}^{nm} w_{j+k}^{\alpha_j}$, $\forall k \in [0, m]$.

10. Define $f_i(\gamma) = f(\gamma)/\pi_i = \Pi_{j=1, j \neq i}^n \pi_j = \Sigma_{j=0}^{nm-m} a_j \gamma^j$, where $a_0, a_1, \ldots, a_{nm-m} \in \mathbb{Z}^*_p$ are the coefficients of the polynomial $f_i$.

11. Calculate $\tilde{D}_i = \tilde{g}_2^{1/\pi_i} = g_2^{f_i(\gamma)} = \Pi_{j=0}^{nm-m} w_j^{a_j}$, and $\tilde{A}_i = \psi(\tilde{D}_i)$.

12. Send $(\tilde{A}_i, x_{i1}, x_{i2}, \ldots, x_{im})$, $\forall i \in [1, n]$, and $(\tilde{g}_1, \tilde{w}_0, \tilde{w}_1, \ldots, \tilde{w}_m)$ to $\mathcal{A}$.

Note that with this information, $\mathcal{A}$ or $\mathcal{B}$ can compute nm tuples $(\tilde{A}_i, \tilde{B}_i, \tilde{C}_{ik}, x_{ik})$ such that $e(\tilde{A}_i, \tilde{B}_i) = e(\tilde{g}_1, \tilde{g}_2)$ and $e(\tilde{g}_1, \tilde{B}_i) = e(\tilde{g}_1^\gamma \tilde{g}_1^{x_{ik}}, \tilde{C}_{ik})$ in the following manner.

13. Define $\pi_i = \Pi_{k=1}^m (\gamma + x_{ik}) = \Sigma_{k=0}^m b_k \gamma^k$, where $b_0, b_1, \ldots b_m \in \mathbb{Z}^*_p$ are the coefficients of the polynomial defined by $\pi_i$.

14. Compute $\tilde{B}_i = \tilde{g}_2^{\pi_i} = \Pi_{k=0}^m \tilde{w}_k^{b_k}$.

15. Define where $f_{ik}(\gamma) = \pi_i/(\gamma + x_{ik}) = \Pi_{j=1, j \neq k}^m (\gamma + x_{ij}) = \Sigma_{j=0}^{m-1} c_j \gamma^j$, where $c_0, c_1, \ldots c_{m-1} \in \mathbb{Z}^*_p$ are the coefficients of the polynomial $f_{ik}$.

16. Compute $\tilde{C}_{ik} = \tilde{g}_2^{f_{ik}(\gamma)} = \Sigma_{j=0}^{m-1} \tilde{w}_j^{c_j}$.

Also, $\mathcal{A}$ or $\mathcal{B}$ can compute nm BSDH pairs $(\tilde{E}_{ik}, x_{ik})$ in the following manner.

$$\tilde{E}_{ik} = e(\tilde{A}_i, \tilde{C}_{ik}) = e(\tilde{g}_1, \tilde{g}_2)^{1/(\gamma + x_{ik})}.$$

Output: $\mathcal{A}$ outputs a forged tuple $(\tilde{A}_*, \tilde{B}_*, \tilde{C}_*, x_*)$, for some $\tilde{A}_* \in \mathbb{G}_1, \tilde{B}_* \in \mathbb{G}_2, \tilde{C}_* \in \mathbb{G}_2$ and $x_* \neq x_{ik}, \forall i \in [1, n], k \in [1, m]$, such that $e(\tilde{A}_*, \tilde{B}_*) = e(\tilde{g}_1, \tilde{g}_2)$ and $e(\tilde{g}_1, \tilde{B}_*) = e(\tilde{g}_1^\gamma \tilde{g}_1^{x_*}, \tilde{C}_*)$.

Having received the forged tuple from $\mathcal{A}$, $\mathcal{B}$ generates a new BSDH pair in the following manner.

17. Define $E' = e(\tilde{A}_*, \tilde{C}_*) = e(\tilde{g}_1, \tilde{g}_2)^{1/(\gamma+x_*)} = e(\tilde{g}_1, g_2)^{f(\gamma)/(\gamma+x_*)}$.

18. Rewrite $f(\gamma)$ as $f(\gamma) = (\gamma + x_*) f_d(\gamma) + d_*$ for some polynomial $f_d(\gamma) = \Sigma_{j=0}^{nm-1} d_j \gamma^j$, and constant $d_* \in \mathbb{Z}^*_p$. This means that $E' = e(\tilde{g}_1, g_2)^{f_d(\gamma) + d_*/(\gamma+x_*)}$.

19. Compute $g_2^{f_d(\gamma)} = \Pi_{j=0}^{nm-1} w_j^{d_j}$, and $$\tilde{E} = \left(E'/e(\tilde{g}_1, g_2^{f_d(\gamma)})\right)^{1/d_*} = e(\tilde{g}_1, g_2)^{1/(\gamma+x_*)}$$
$$= e(g_1, g_2)^{f(\gamma)/(\gamma+x_*)} = e(g_1, g_2)^{f_d(\gamma) + d_*/(\gamma+x_*)}.$$

20. Calculate $E_* = (\tilde{E}/e(g_1, g_2^{f_d(\gamma)}))^{1/d_*} = e(g_1, g_2)^{1/(\gamma+x_*)}$.

Hence, $\mathcal{B}$ returns the tuple $(E_*, x_*)$ as the solution to the submitted instance of the BSDH problem.

THEOREM 2 In the random oracle model, suppose an algorithm $\mathcal{A}$ breaks the traceability of GSPR with advantage $\epsilon$, after $q_H$ hash queries and $q_S$ signature queries, then there exists an algorithm $\mathcal{B}$ that breaks the q-BSDH assumption with advantage $(\epsilon/n - 1/p)^2/16 q_H$, where $q = (n+1)m$.

PROOF. The following is an interaction between $\mathcal{A}$ and $\mathcal{B}$.

Setup: $\mathcal{B}$ is given a bilinear group pair $(\mathbb{G}_1, \mathbb{G}_2)$ with respective generators $g_1$ and $g_2$. $\mathcal{B}$ is also given $(w_0, w_1, \ldots w_m)$, where $w_k = g_2^{\gamma^k}, \forall k \in [0, m]$. Further, $\mathcal{B}$ is given $(A_i, y_i), \forall i \in [1, n]$. For each i, either $s_i = 1$ indicating that a valid key pair $(A_i, y_i)$ generated using equations (1) and (2) is known, or $s_i = 0$ indicating that $A_i$ corresponding to $y_i$ is not known. Run $\mathcal{A}$ giving it $gpk = (g_1, w_0, w_1, \ldots w_m)$ and $y_i, \forall i \in [1, n]$. Note that $y_i$ can be used to generate the alias tokens using equation (1).

Queries: $\mathcal{A}$ can query $\mathcal{B}$ about the following.

Hash queries: $\mathcal{A}$ queries the hash functions $H_z$ and $H_g$, and B responds with random values with consistency.

Signing queries: $\mathcal{A}$ requests a signature of member i on message M. If $s_i = 1$, $\mathcal{B}$ responds with the signature $\sigma$ using Sign algorithm with the private key $(A_i, y_i)$. If $s_i = 0$, B selects $x_{ik}, \alpha, \beta, \delta$ to compute $T_1, T_2, T_3$ and $T_4$ and the SPK V as in equation (5). If the hash function causes a collision, $\mathcal{B}$ declares failure and aborts; otherwise, $\mathcal{B}$ responds with $\sigma = (x_{ik}, T_1, T_2, T_3, T_4, c, s_\alpha, s_\beta, s_\delta)$. Assume that the signing queries related to a signer does not exceed m.

Corruption queries: $\mathcal{A}$ requests the secret key of member i. If $s_i = 1$, $\mathcal{B}$ adds i to U, and responds with $(A_i, y_i)$; otherwise, B declares failure and aborts. With $(A_i, y_i)$, $\mathcal{A}$ can compute alias tokens $x_{ik}, \forall k \in [1, m]$ using equation (1), $B_i$ using equation (3), and $C_{ik}, \forall k \in [1, m]$ using equation (4).

Output: Finally, if $\mathcal{A}$ is successful, it outputs a forged signature $\sigma^*$ on a message $M^*$ using tuple $(A_{i'}, B_{i'}, C_{i'k}, X_{i'k})$. If $\mathcal{B}$ fails to find the signer i' in U, it outputs $\sigma^*$; otherwise, $\mathcal{B}$ identifies some i'=i. If $s_{i'} = 0$, $\mathcal{B}$ outputs $\sigma^*$; otherwise, $\mathcal{B}$ declares failure and aborts.

With the above framework, there can be two types of forger algorithms. Type I forger forges a signature of the member who is different from all $i \in [1, n]$. Type II forger forges a signature of the member $i \in [1, n]$ whose corruption is not requested. $\mathcal{B}$ treats these two types of forgers differently. Note that using the technique of Lemma 1, with a q-BSDH instance $(\hat{g}_1, \hat{g}_2, \hat{g}_2^\gamma, \ldots \hat{g}_2^{\gamma^q})$, $\mathcal{B}$ can obtain $(g_1, g_2, g_2^{\gamma^k}, \ldots, g_2^{\gamma^m})$ and (q-m) BSDH pairs. Moreover, any BSDH pair besides these (q-m) pairs can be transformed into a solution to the original q-BSDH instance which means that the q-BSDH assumption is broken.

Type I Forger: From an instance of (n+1)m-BSDH, $\mathcal{B}$ obtains $(g_1, g_2, g_2^{\gamma^k}, \ldots, g_2^{\gamma^m})$, and n tuples $(A_i, x_{i1}, x_{i2}, \ldots x_{im})$. From these n tuples, $\mathcal{B}$ obtains n valid key pairs $(A_i, y_i)$ by setting $H_z(y_i, k) = x_{ik}, \forall i \in [1, n], k \in [1, m]$. $\mathcal{B}$ applies the above framework to $\mathcal{A}$. The framework succeeds whenever $\mathcal{A}$ succeeds. Hence, $\mathcal{B}$ obtains the Type I forgery with the probability $\epsilon$.

Type II Forger: From an instance of nm-BSDH, $\mathcal{B}$ obtains $(g_1, g_2, g_2^{\gamma^k}, \ldots, g_2^{\gamma^m})$, and n−1 tuples $(A_i, x_{i1}, x_{i2}, \ldots x_{im})$. From these n−1 tuples, $\mathcal{B}$ obtains n−1 valid key pairs $(A_i, y_i)$ by setting $H_z(y_i, k) = x_{ik} \forall i \in [1, n-1], k \in [1, m]$. These n−1 pairs $(A_i, y_i)$ are distributed among n indices. $\mathcal{B}$ sets $s_i = 0$ for the unfilled entry at random index i'. $\mathcal{B}$ selects $$A_{i'} \xleftarrow{R} \mathbb{G}_1,$$

and $$y_i \xleftarrow{R} \mathbb{Z}^*_p.$$

$\mathcal{B}$ applies the framework to $\mathcal{A}$. The framework succeeds only if $\mathcal{A}$ never requests the corruption of member i', but forges a signature that traces to $A_{i'}$. The value of i' is independent of the views of $\mathcal{A}$, and hence $\mathcal{B}$ obtains the Type II forgery with probability at least $\varepsilon/n$.

$\mathcal{B}$ obtains another BSDH pair beyond the given nm BSDH pairs using the framework with Type I or Type II forger in the following manner, contradicting the BSDH assumption. $\mathcal{B}$ rewinds the framework to obtain two forged signatures on the same message, where the commitments are the same, but the challenges and responses are different. The probability of success in achieving this is at least $(\varepsilon'-1/p)^2/16q_H$ by the forking lemma, where $\varepsilon'$ is the probability that the framework on each forger succeeds. $\mathcal{B}$ extracts $(A_*, B_*, C_*, x_*)$ encoded in the forged signatures. Further, $\mathcal{B}$ obtains a BSDH pair from $(A_*, B_*, C_*, x_*)$ using the technique discussed in Lemma 1. The framework is successful only if the extracted BSDH pair is not among the BSDH pairs created by $\mathcal{B}$. Therefore, $\mathcal{B}$ obtains a new BSDH pair with the probability $(\varepsilon'-1/p)^2/16 \, q_H$.

Hence, it is shown that $\mathcal{B}$ can solve the (n+1)m-BSDH instance with probability $(\varepsilon-1/p)^2/16 \, q_H$ using Type I forger, and the nm-BSDH instance with probability $(\varepsilon/n-1/p)^2/16 \, q_H$ using Type II forger. Therefore, the pessimistic Type II forger proves the theorem. This implies that traceability is satisfied in GSPR in the random oracle model under the BSDH assumption.

5.4 Revocation Correctness

In the following discussion, the correctness of the results generated by the revocation check algorithm, RevCheck is discussed. The revocation correctness depends on the cross correlation property of the alias codes since the revocation code is generated by summing over multiple alias codes. Here, two categories of codes from the existing literature can be potentially used as alias codes—orthogonal codes and non-return-to-zero (NRZ) based random codes.

A new type of codes can be referred to as piecewise-orthogonal codes which can be used as alias codes. With the use of piecewise-orthogonal codes, GSPR's RevCheck algorithm does not determine the revocation status of a private key with certainty, but instead with a certain probability. If an alias token has been revoked and its corresponding alias code has been included in the revocation code, then RevCheck's result is guaranteed to be correct. However, there is a possibility of a false alarm. Using an iterative algorithm, this probability can be decreased iteratively, a la the well-known Miller-Rabin primality test algorithm. The details of the revocation check procedure and iterative algorithm are given in Section 5.4.1.

For analyzing the revocation correctness, define two hypotheses—$H_0$:$x_{ik}$ has been revoked, and $H_1$:$x_{ik}$ has not been revoked. Here, the probability of false negative/dismissal, $P_{fd}$, can be defined as the probability of erroneously determining that a given alias token has not been revoked when it has been revoked by the group manager. In RevCheck, $P_{fd}$ is equal to the probability of $z<\tau$ when $H_0$ is true. Also, probability of false positive/alarm, $P_{fa}$, can be defined as the probability of the verifier erroneously determining that a given alias token has been revoked when it has not been revoked by the group manager. In RevCheck, $P_{fa}$ is equal to the probability of $z \geq \tau$ when $H_1$ is true. Further, suppose that the number of revoked private keys is represented by $n_r$, and each alias token (or each element in $\mathbb{Z}^*_p$) is represented by $b_p$=160 bits. Note that the number of revoked alias tokens (i.e., $m \cdot n_r$) is equal to the number of revoked alias codes, and the length of the revocation code is equal to the length of an alias code (i.e., l).

Orthogonal Codes: Orthogonal or Walsh codes consist of codes with zero cross-correlation. When the two codes are the same, the value of the cross-correlation is 1; otherwise, it is 0. If these codes are used as alias codes, the threshold can be set to $\tau=1$, and the revocation check procedure with $P_{fd}=0$ and $P_{fa}=0$ can be achieved. This means that if orthogonal codes are used as alias codes, GSPR would be able to satisfy the revocation correctness property with certainty. However, there are only l unique orthogonal codes of length l samples. This means that if orthogonal codes are indexed using the alias token $x_{ik}$ which is represented by $b_p$=160 bits, then the length of each alias code has to be $l=2^{160}$ samples long! Hence, it is prohibitively costly in terms of storage and processing overhead to use completely orthogonal codes as alias codes.

NRZ based Random Codes: Random codes can be generated by NRZ encoding of a random sequence of bits, which means bit 0 is mapped to sample −1, and bit 1 is mapped to sample +1. As a result, the number of unique random codes with length $b_p$ is given by $2^{b_p}$. If the random codes are utilized as alias codes, an alias code can be generated with length, $l=b_p$=160 samples, by NRZ encoding of an alias token, $x_{ik}$. The use of random codes allows us to use compact alias codes. However, note that use of random codes results in $P_{fd}>0$. As a result of the random nature of the codes, there are inevitable false dismissals, which means there is significant possibility that the verifier may not be able to detect a revoked private key.

A type of codes that can be referred to as piecewise-orthogonal codes is described herein. The use of piecewise-orthogonal codes enables us to create alias codes that are compact and have a property—viz., $P_{fd}=0$ and $P_{fa}>0$. In other words, for piecewise-orthogonal codes, the probability of false dismissals is guaranteed to be zero, although the probability of false alarms is non-zero. Note that to ensure security, $P_{fd}=0$ is more important than $P_{fa}=0$. The former implies that a revoked alias token can detected by RevCheck with 100% certainty. The next subsection provides details on how piecewise-orthogonal codes are used in probabilistic revocation.

5.4.1 Revocation with Piecewise-Orthogonal Codes

GSPR can utilize piecewise-orthogonal codes as alias codes for achieving probabilistic revocation. The piecewise-orthogonal codes are generated by concatenating multiple segments where each segment is an orthogonal code. To generate a piecewise-orthogonal code as an alias code, an alias token is divided into multiple segments, and an orthogonal code is generated corresponding to each segment. These orthogonal codes corresponding to the segments of the alias token are concatenated to form the complete alias code. In this way, the alias codes are piecewise-orthogonal.

Specifically, a set of $2^{b_s}$ orthogonal codes, denoted by $\mathbb{C}_s$, is generated where each orthogonal code is of length $2^{b_s}$. Note that an orthogonal code in $\mathbb{C}_s$ can be retrieved using a $b_s$-bit index. Further, each alias token $x_{ik} \in \mathbb{Z}^*_p$ of $b_p$ bits is divided into d segments each of length $b_s$ bits, such that $d \cdot b_s \leq b_p < (d+1) \cdot b_s$. The segments of the alias token $x_{ik}$ are represented by $x_{ik,j}$, $\forall j \in [1, d]$. Further, $\forall j \in [1, d]$, $x_{ik,j}$ is utilized to generate $b_s$-bit index so that an orthogonal code $s_{ik,j}$ is chosen from $\mathbb{C}_s$. Finally, all the d orthogonal codes, $s_{ik,j}$, $\forall j \in [1, d]$, are concatenated to generate the alias code $s_{ik}$. The length of the resulting revocation code is $l=d \cdot 2^{b_s}$. The group manager declares the two public parameters $\mathbb{C}_p$ and $F_c$, such that the set of all possible alias codes $\mathbb{C}_p = \mathbb{C}_s^d$, and the mapping function $F_c: \mathbb{Z}^*_p \to \mathbb{C}_p$ is defined as segment-wise indexing as discussed above.

When the revocation code is generated using the Revoke algorithm, each segment of the revocation code is generated by summation of the corresponding segments of the revoked alias codes. Hence, the generated revocation code also has d segments, represented by $RC_j$, $\forall j \in [1, d]$. Note that due to the property of orthogonal codes, the cross-correlation of a revocation code's segment and an orthogonal code results in one of the two values—(1) 0 if the revocation code was not generated by the orthogonal code, or (2) an integral multiple of 1 if the revocation code was generated by the orthogonal code. Hence, the threshold $\tau$ is set to 1.

Having received a signature with alias token $x_{ik}$, the verifier can run RevCheck for each of the d segments. However, to minimize the computational overhead, the verifier only runs RevCheck for a segments. This means that RevCheck can be re-organized as follows.

RevCheck(RC, σ)
21. Set j=1.
22. Generate a $b_s$-bit index from $X_{ik,j}$, and select an orthogonal code $S_{ik,j}$ from $\mathbb{C}_s$.
23. Compute $$z = \frac{1}{2^{b_s}} s_{ik,j}^T \cdot RC_j.$$

If z≥1, output invalid; otherwise, output valid, and exit.
24. Set j=j+1. If j≤a, go to Step 2; otherwise, exit.

TABLE 1

The alias and revocation codes used in the example.

| | | | | | | | | |
|---|---|---|---|---|---|---|---|---|
| $s_1$ | +1 | −1 | −1 | +1 | +1 | −1 | −1 | +1 |
| $s_2$ | +1 | +1 | −1 | −1 | +1 | +1 | −1 | −1 |
| $s_3$ | +1 | −1 | +1 | −1 | +1 | −1 | +1 | −1 |
| $s_4$ | +1 | −1 | −1 | +1 | +1 | −1 | +1 | −1 |
| $s_5$ | +1 | −1 | −1 | +1 | +1 | +1 | −1 | −1 |
| RC = $s_1 + s_2$ | +2 | 0 | −2 | 0 | +2 | 0 | −2 | 0 |

5.4.2 Example

The revocation check procedure in GSPR can be described through an example. The alias codes and the revocation code used in the example are given in Table 1. Assume that there are five 4-bit alias tokens represented by $x_1=\{1111\}$, $x_2=\{1010\}$, $x_3=\{0101\}$, $x_4=\{1101\}$ and $x_5=\{1110\}$. Also, assume that $\mathbb{C}_s$ contains $2^2=4$ orthogonal codes. The group manager generates the alias codes $s_1$, $s_2$, $s_3$, $s_4$, and $s_5$—corresponding to $x_1$, $x_2$, $x_3$, $x_4$, and $x_5$, respectively—by concatenating two orthogonal codes of length 4 samples. Suppose that the group manager needs to revoke alias tokens $x_1$ and $x_2$. Hence, the group manager computes the sample-by-sample addition of the alias codes $s_1$ and $s_2$. The resulting vector is the revocation code, represented by RC. The group manager provides the verifier with RC. In this scenario, if the verifier receives a signature with the alias token $x_1$, he runs two iterations of RevCheck. In the first iteration, the verifier computes the cross correlation between the first segments, i.e., first 4 samples of $s_1$ and RC, represented by $s_{1,1}$ and $RC_1$, respectively. In the second iteration, the verifier computes the cross correlation between the second segments, i.e., second 4 samples of $s_1$ and RC represented by $s_{1,2}$ and $RC_2$, respectively. The cross correlation is computed by sample-by-sample multiplication of the alias code and the revocation code followed by the addition of all the products, and the resulting value is given by ¼ $s_{1,1}^T \cdot RC_1 = 1$, and ¼ $s_{1,2}^T \cdot RC_2 = 1$. Since the cross correlation of both the segments resulted in the value of 1, the verifier concludes that $x_1$ has been revoked. Using the same procedure, the verifier concludes that $x_2$ has also been revoked. On the other hand, if the verifier receives a signature with the alias token $x_3$, he will conclude that the alias token is valid because the cross correlation of $s_{3,1}$ with $RC_1$ is 0. Here, the RevCheck algorithm exits after the first iteration. Now, let us take a look at $x_4$. The cross correlation of $s_{4,1}$ and $s_{4,2}$ with $RC_1$ and $RC_2$ results in the values 1 and 0, respectively. Here, if the verifier makes a decision after only computing the correlation of the first segment, to decrease its computational overhead, he erroneously determines that $x_4$ has been revoked because this is an instance of a false alarm. However, after computing the correlation of the second segment, the verifier can conclude with absolute confidence that $x_4$ has not been revoked because $P_{fd}=0$. Lastly, the cross correlation of $s_{5,1}$ and $s_{5,2}$ with $RC_1$ and $RC_2$ results in 1 and 1, respectively. Hence, if the verifier receives a signature with an alias token $x_5$, he erroneously concludes that $x_5$ has been revoked.

5.4.3 Discussions on the False Alarm Probability

With the proposed piecewise-orthogonal codes, the probability of false dismissal is zero, i.e., $P_{fd}=0$. However, after checking a segments, the upper bound of the probability of false alarm ($P_{fa}$) can be computed to be $$P_{fa} = \frac{(mn_r)^a 2^{b_p - abs} - mn_r}{2^{b_p} - mn_r} = \frac{n_t^a 2^{b_p} - mn_r}{2^{b_p} - mn_r} \approx n_t^a \quad (9)$$

where the ratio of the number of revoked alias tokens and the length of one segment of the revocation code is represented by $n_t = mn_r/2^{b_s}$. For $n_t < 1$, $P_{fa}$ decreases by increasing a which is the maximum number of iterations or segments processed by the verifier before making a revocation status decision. Here, the revoked alias tokens have unique segments, and hence the above equation gives the upper bound of $P_{fa}$. Note that each alias token of $b_p$ bits is unique; however each segment of an alias token, which is $b_s$ bits long, is not necessarily unique.

If the verifier runs RevCheck for a iterations, then the length of the alias code that has to be processed is $l_r = a \cdot 2^{b_s}$, and $P_{fa} \approx n_t^{l_r n_t / mn_r}$. Note that the computational overhead for RevCheck is directly proportional to $l_r$. There is a tradeoff between $P_{fa}$ and RevCheck's computational cost, and there are a number of different strategies for making an advantageous tradeoff. One possible strategy is to construct the revocation code in such a manner that minimizes $P_{fa}$ for a given value of $l_r$ and for a given number of revoked alias tokens (i.e., $mn_r$) by selecting an optimal value of $b_s$. Once the optimal value of $b_s$ is computed, the corresponding $n_t$ can be computed using the relation $n_t = mn_r/2^{b_s}$. This value can be readily derived as $n_t = \exp(-1) \approx 0.3679$. However, $mn_r$ and $2^{b_s}$ are both integer values, and hence to minimize $P_{fa}$, the group manager can select $b_s$ such that $$\frac{\exp(-1)}{2} \leq \frac{mn_r}{2^{b_s}} < 3\exp(-1)/2.$$

Figure 2:
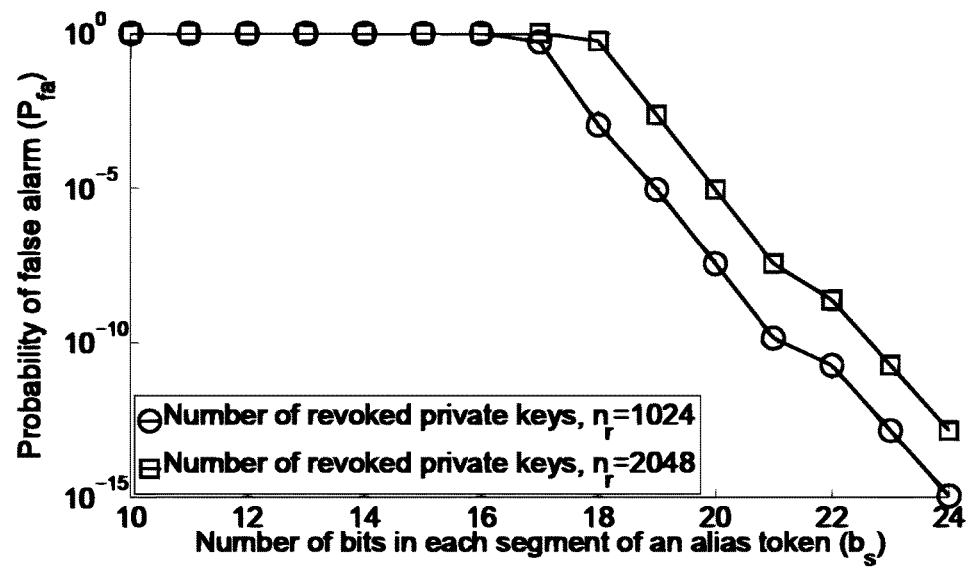
FIG. 2 is a graph that shows example false alarm probabilities for numbers of bits in each segment of an alias token, according to various examples described herein.

As discussed above, the number of iterations (i.e., a) and the number of bits in each segment of an alias token (i.e., $b_s$) are adjustable parameters that directly impact $P_{fa}$. FIG. 1 shows the impact of a on $P_{fa}$ for a fixed value of $b_s = 19$. This figure suggests that the verifier can decrease $P_{fa}$ at the cost of increasing the computational cost of performing Rev- Check. FIG. 2 illustrates the impact of $b_s$ on $P_{fa}$ when the verifier utilizes all of the d segments of the revocation code to check the revocation status of an alias token. In both figures, the values m=120 and $b_p$=160 bits are fixed.

5.4.4 Security Implications of the Alias Codes

There is a one-to-one mapping between an alias code and an alias token defined by $F_c$. Although the alias codes have a non-random structure, the alias tokens, which are embedded in the signature, are random numbers under the random oracle model. Hence, the use of alias codes should have no impact on the traceability property of GSPR, which is defined by Theorem 2.

TABLE 2

Comparison of computationally expensive operations.

|  |  | Exp. In $\mathbb{G}_1/\mathbb{G}_2$ | Exp. In $\mathbb{G}_T$ | Bilinear map |
|---|---|---|---|---|
| GSPR | Sign | 6 | 4 | 3 |
|  | SignCheck | 2 | 5 | 4 |
|  | RevCheck | 0 | 0 | 0 |
| BS | Sign | 5 | 3 | 3 |
|  | SignCheck | 4 | 4 | 4 |
|  | RevCheck | 0 | 0 | $n_r + 1$ |
| BCNSW | Sign | 3 | 1 | 1 |
|  | SignCheck | 0 | 2 | 5 |
|  | RevCheck | 0 | 0 | $n_r$ |

TABLE 3

Comparison of computational overhead (ms).

|  | Sign | SignCheck | RevCheck |
|---|---|---|---|
| GSPR | 14.952 | 9.124 | 5.819 |
| BS | 15.417 | 15.378 | 1628.729 |
| BCNSW | 3.242 | 8.302 | 1592.019 |

TABLE 4

Comparison of number of elements communicated in the considered scenarios.

|  |  | Elem. In $\mathbb{Z}_p^*$ | Elem. in $\mathbb{G}_1/\mathbb{G}_2$ | Int. |
|---|---|---|---|---|
| GSPR | manager-signer | 1 | 1 | 0 |
|  | signer-verifier | 5 | 4 | 0 |
|  | manager-verifier | 0 | 0 | 1 |
| BS | manager-signer | 1 | 1 | 0 |
|  | signer-verifier | 5 | 2 | 0 |
|  | manager-verifier | 0 | $n_r$ | 0 |
| BCNSW | manager-signer | 1 | 3 | 0 |
|  | signer-verifier | 2 | 3 | 0 |
|  | manager-verifier | 0 | $n_r$ | 0 |

TABLE 5

Comparison of communication overhead (bits).

|  | manager-signer | signer-verifier | manager-verifier |
|---|---|---|---|
| GSPR | 672 | 2848 | $5.03 \cdot 10^7$ |
| BS | 672 | 1824 | $5.24 \cdot 10^5$ |
| BCNSW | 1696 | 1856 | $5.24 \cdot 10^5$ |

6. Performance Evaluation

This section evaluates the computational and communication overhead of GSPR, and compare GSPR's performance with two schemes in the prior art—the Boneh-Shacham (BS) scheme and the Bichsel-Camenisch-Neven-Smart-Warinschi (BCNSW) scheme. BS and BCNSW are two of the most practical group signature schemes in terms of being scalable to large networks. If the isomorphism is an identity map, $\mathbb{G}_1=\mathbb{G}_2$. Assume symmetric 80-bit security level, which provides approximately the same level of security as an RSA signature with a modulus size of 1024 bits. In an elliptic curve cryptosystem, to achieve the same security strength, the length of an element in $\mathbb{Z}_p^*$, and $\mathbb{G}_1$ should be approximately equal to 160 bits. Specifically, one can utilize the "Type A" internal described in pairing-based cryptography (PBC) library. The internal is constructed on a supersingular curve of the form $y^2=x^3+x$ over the field $F_q$ for some prime q=3mod4. In the internal, an element in $\mathbb{Z}_p^*$ is denoted by 160 bits, and an element in $\mathbb{G}_1$ or $\mathbb{G}_2$ is denoted by 512 bits. For this example of GSPR, assume that the group manager distributes 120 alias tokens for each signer, and the probability of false alarm should be less than 0.01.

6.1 Computational Overhead

This section, compares a computational cost of GSPR with two benchmarks—viz., BS and BCNSW. This section focuses on three specific algorithms: Sign (signature generation algorithm), SignCheck (signature correctness checking algorithm), and RevCheck (revocation status checking algorithm). These algorithms can be executed on-line in real time, and moreover they should be performed by the signer and the verifier, who have limited computational capabilities compared to the group manager.

Firstly, a computationally expensive operation is considered—i.e., exponentiation (Exp.) in $\mathbb{G}_1$, $\mathbb{G}_2$, or $\mathbb{G}_T$, and bilinear mapping. Here, since $\mathbb{G}_1=\mathbb{G}_2$, the application of isomorphism is not considered. Table 2 provides the number of operations for each of the three algorithms for GSPR, BS and BCNSW. Note that in GSPR, the operations in Step 1 in the Sign algorithm are independent of the message to be signed or the random parameters, and hence, they can be pre-computed. Also, $\psi(w_1)$ and $e(g_1, g_2)$ can also be pre-computed. Further, in the RevCheck algorithm in GSPR, the computational cost of computing the cross-correlation between a revocation code and an alias code is 1 integer additions since the length of the revocation code is 1 with each element being an integer, and the alias code is a vector of +1s and −1s.

By using the PBC library, implement the three algorithms for GSPR, BS and BCNSW, and measure their running time on a PC platform with Intel(R) Core(TM)2 Duo CPU E8400 @ 3 GHz. The measurements are obtained by averaging over 1000 runs of each algorithm. Table 3 provides their running times on the PC platform. Here, assume that the number of revoked private keys is 1024, i.e, $n_r$=1024. From Table 3, observe that there is no significant difference in the computation times of the three schemes when comparing their performance with respect to Sign and SignCheck. However, the difference between GSPR and the other two schemes in terms of the computational cost of RevCheck is significant. GSPR's RevCheck algorithm is more than two orders of magnitude more efficient than those of the other two schemes. Hence, when the total signature verification time is considered, which includes the time used to perform SignCheck as well as RevCheck, the running time in GSPR can be less than that in BS and BCNSW.

Figure 3:
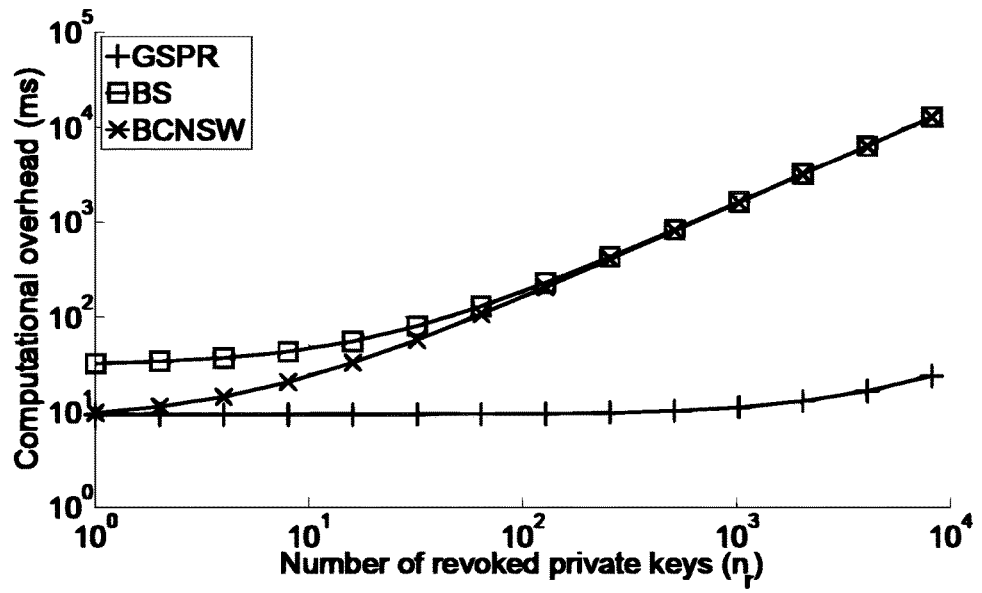
FIG. 3 is a graph that compares example computational overhead for numbers of revoked private keys to other schemes, according to various examples described herein.

FIG. 3 shows the computation time to verify a signature versus the number of revoked private keys. With only a few thousand revoked private keys, the computation times for BS and BCNSW quickly grow to several seconds for verifying only one signature. In contrast, the growth rate of GSPR's computation time is lower, which is primarily due to the computational efficiency advantage of GSPR's RevCheck.

6.2 Communication Overhead

Consider the three communication scenarios—between the group manager and the signer (manager-signer), between the signer and the verifier (signer-verifier), and between the group manager and the verifier (manager-verifier). In the first scenario, while joining the group, the group manager sends a secret key to the signer. In the second scenario, the signer sends a signature to the verifier. Lastly, in the third scenario, the group manager sends a revocation list/code to the verifier. Table 4 provides the number of elements (Elem.) of $\mathbb{Z}^*_p$, $\mathbb{G}_1$, $\mathbb{G}_2$ or integers (Int.) communicated in each of the three scenarios for GSPR, BS and BCNSW. Note that in GSPR, the alias tokens are generated by the signer using the secret key obtained from the group manager, and hence they do not need to be communicated.

Table 5 shows the communication overhead of the three schemes for the three scenarios, assuming $n_r=1024$. Results from the table indicate that GSPR's communication overhead is two orders of magnitude larger than those of the other two schemes when considering the manager-verifier scenario. Hence, GSPR makes an advantageous trade-off between computational overhead and communication overhead. This trade-off is advantageous because reducing the computational overhead is often more important than reducing the communication overhead when considering scalability. Verifying a signature (which includes checking the revocation status of the private key) is an inherently on-line task which should be performed in real time, and it can be the primary performance bottleneck when the scheme is deployed in a large network. However, the greater communication overhead incurred by GSPR in the third (i.e., manager-verifier) scenario can be readily mitigated by pre-fetching the revocation code before the verifier needs to verify a given signature.

Figure 4:
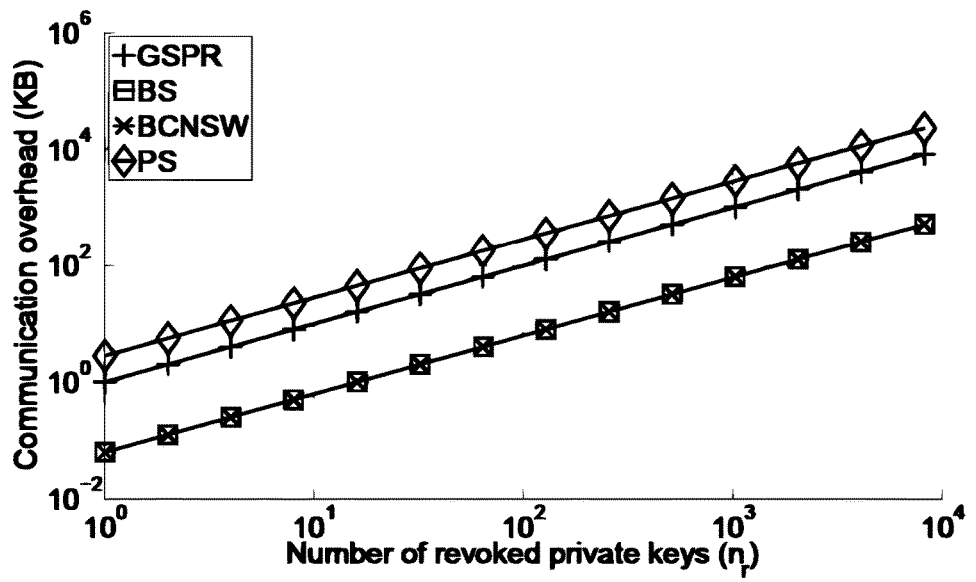
FIG. 4 is a graph that compares example communication overhead for numbers of revoked private keys to other schemes, according to various examples described herein.

In FIG. 4, four schemes in terms of the communication overhead to transmit the revocation list (for GSPR, it is the revocation code) are compared. The top-most curve is the curve for a pseudonym-based signature (PS) with Elliptic Curve Digital Signature Algorithm (ECDSA) with the public key size of 192 bits to achieve the 80-bit security level. For PS, assume that the number of pseudonyms allotted to each signer is 120, and the group manager publishes public-key certificates of all the revoked pseudonyms in the revocation list. In FIG. 4, although the communication overhead of GSPR is higher as compared to BS and BCNSW, it is still lower than PS.

7. Use of GSPR in DSRC Applications

To illustrate the practical advantages of GSPR, this section compares the signature verification performance of GSPR with two benchmarks (i.e., BS and BCNSW) for a specific type of applications, viz., vehicular network (VANET) safety applications. Since the allocation of the Dedicated Short-Range Communications (DSRC) spectrum in the 5.9 GHz band by the Federal Communications Commission (FCC), the automotive industry and the other stakeholders have been actively developing DSRC technologies, with a particular focus on vehicular safety applications.

In a typical safety application, each vehicle broadcasts beacon messages that contain information for safety, such as speed, direction of movement, acceleration, etc. The beacon messages should be authenticated, but, at the same time, the privacy of the transmitting vehicle's driver should be protected. Without such protection, adversaries can use the beacon messages to track the driver's movement or, worse yet, use them for more nefarious purposes. Hence, safety applications is one important application domain for privacy-preserving authentication techniques.

Typically, beacon messages are broadcast in intervals of 100 ms. In high vehicular density scenarios, a given vehicle is expected to receive a large number of beacon messages within a broadcast interval, and each message should be authenticated before the arrival of the next message from the same transmitter. If the authentication of the current message cannot be finished before the arrival of the next message, then the current message can be discarded because it is considered to contain "stale" information. To measure the impact of the computational cost of signature verification on the performance of safety applications employ the average message loss ratio, which is defined as the ratio between the number of beacon messages discarded due to signature verification latency and the total number of beacon messages received by a particular vehicle in a broadcast interval of 100 ms.

Figure 5:
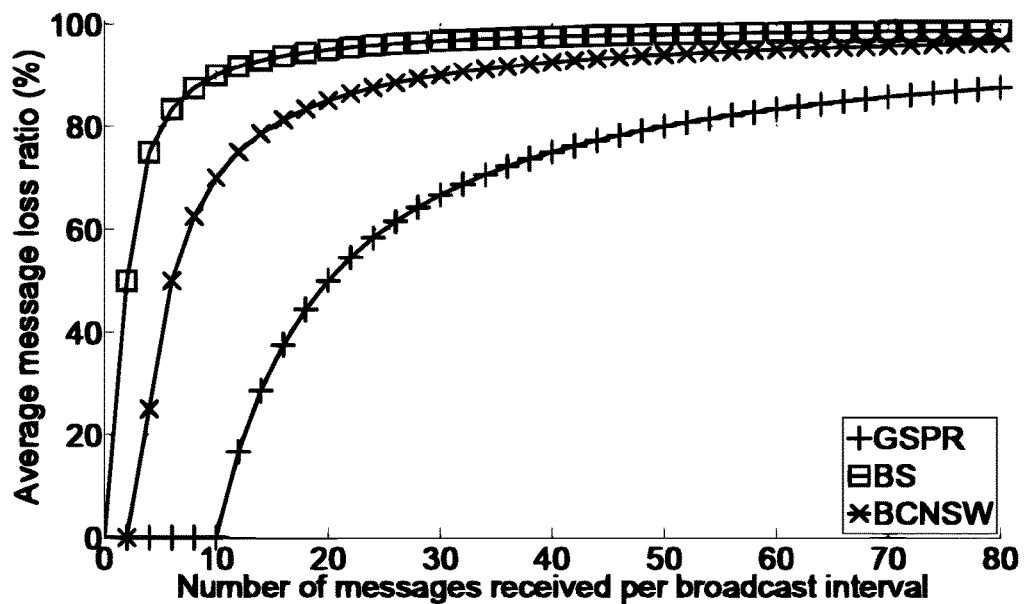
FIG. 5 is a graph that compares an example average message loss ratio for numbers of messages received per broadcast interval to other schemes, according to various examples described herein.

This simulation of GSPR assumes that each vehicle is on the road for 2 hours per day, and replaces its current alias token with a new one every minute, which equates to 120 alias tokens per day. The simulation results are shown in FIG. 5 assuming $n_r=64$. From this figure, GSPR's signature verification procedure is efficient enough to ensure acceptable performance for safety applications under reasonably-favorable conditions. In contrast, results suggest that the computational burden of the verification procedures used by BS and BCNSW is too heavy for their use in vehicular safety applications.

As described herein, a novel privacy-preserving authentication scheme called Group Signatures with Probabilistic Revocation (GSPR) is provided. Revocation is the primary performance bottleneck of modern group signature schemes and that existing schemes do not scale well to large networks because of high computational cost of their revocation check procedures. By using the novel concept of probabilistic revocation, GSPR manages to significantly reduce the computational burden of the revocation check procedure at the cost of increased communication overhead. The negative impact of the increased communication overhead can be mitigated by pre-fetching the revocation code from the group manager before signature verification.

Therefore, the following is claimed:

1. A computer-implemented method, comprising:
receiving, by at least one computing device, a signature including an alias token;
mapping, by the at least one computing device, the alias token to an alias code comprising a plurality of orthogonal alias code segments;
receiving, by the at least one computing device, a revocation code comprising a plurality of revocation code segments, each of the revocation code segments corresponding to a respective one of the alias code segments, wherein the revocation code comprises a sum of at least one revoked alias code;
probabilistically determining, by at least one computing device, a revocation status of the alias token based at least in part on at least one of the alias code segments and a corresponding at least one of the revocation code segments, wherein probabilistically determining the revocation status includes cross-correlating a subset of the alias code segments and a corresponding subset of the revocation code segments over a number of iterations, each iteration including a cross-correlation of one of the alias code segments and a corresponding one of the revocation code segments; and accept or discard a message based on the revocation status.

2. The computer-implemented method of claim 1, wherein the revocation code is received over a network.

3. The method of claim 1, wherein probabilistically determining the revocation status can result in a false positive revocation of the alias token but cannot result in a false negative revocation of the alias token.

4. The computer-implemented method of claim 1, wherein the alias token comprises a plurality of alias token segments and a length of each of the revocation code segments is based at least in part on a number of bits of a respective one of the alias token segments.

5. The computer-implemented method of claim 4, wherein a length of each of the revocation code segments is based at least in part on a number of bits of a respective one of the alias token segments.

6. The method of claim 1, wherein the at least one revoked alias code corresponds to at least one revoked alias token.

7. The computer-implemented method of claim 1, wherein the alias token is one of a plurality of alias tokens corresponding to a secret key.

8. The computer-implemented method of claim 1, wherein each of the alias code and the at least one revoked alias code is composed of elements selected from the group consisting of positive one and negative one.

9. The computer-implemented method of claim 1, further comprising authenticating the message in response to the revocation status indicating that the alias token is not revoked.

10. A system, comprising:
at least one computing device; and
a memory comprising computer-readable instructions stored thereon that, when executed by the at least one computing device, direct the at least one computing device to at least:
determine a set of orthogonal codes;
determine that an alias token is a revoked alias token, the alias token being separable into a plurality of alias token segments of a predetermined number of bits;
map the each of the alias token segments to a respective one of a plurality of alias code segments based at least in part on the set of orthogonal codes;
generate an alias code by concatenating the alias code segments;
calculate a revocation code as a sum of a plurality of revoked alias codes including the alias code, the revocation code comprising a plurality of revocation code segments, each of the revocation code segments corresponding to a respective one of the alias code segments; and
wherein a computing device accepts or discards a message based on a cross-correlation of a subset of the alias code segments and a corresponding subset of the revocation code segments over a number of iterations, each iteration including a cross-correlation of one of the alias code segments and a corresponding one of the revocation code segments.

11. The system of claim 10, wherein when executed the instructions further cause the at least one computing device to at least provide access to the revocation code via a network.

12. The system of claim 10, wherein when executed the instructions further cause the at least one computing device to at least generate a plurality of alias tokens, a secret key corresponding to the alias tokens, and a revocation token corresponding to the alias tokens.

13. The system of claim 12, wherein the alias tokens, the secret key, and the revocation token are generated in response to a request to join a group, and when executed the instructions further cause the at least one computing device to at least include an entry in a registration list corresponding to the group.

14. The system of claim 13, wherein when executed the instructions further cause the at least one computing device to at least identify a signer that initiated the request using the entry.

15. The system of claim 10, wherein determining the set of orthogonal codes includes determining a number of the orthogonal codes in the set as two to a power of the predetermined number of bits.

16. A system comprising:
at least one computing device;
a memory comprising computer-readable instructions stored thereon that, when executed by the at least one computing device, direct the at least one computing device to at least:
receive a signature including an alias token;
map the alias token to an alias code comprising a plurality of alias code segments, each of the alias code segments being based at least in part on a set of orthogonal codes and corresponding to a segment of the alias token;
receive a revocation code, wherein the revocation code comprises a plurality of revocation code segments, each of the revocation code segments corresponding to a respective one of the alias code segments, wherein the revocation code comprises a sum of at least one revoked alias code;
determine a revocation status of the alias token based at least in part on an iterative cross-correlation of a respective one of a subset of the alias code segments with a corresponding segment of the revocation code segments over a number of iterations; and
accept or discard a message based on the revocation status.

17. The system of claim 16, wherein the revocation code is received over a network.

18. The system of claim 17, wherein when executed the instructions further cause the at least one computing device to at least perform additional cross-correlations of additional ones of the alias code segments with additional corresponding segments of the revocation code, wherein each one of the additional cross-correlations increases a certainty of the revocation status.

19. The system of claim 17, wherein a result of the cross-correlation includes at least one of a certain determination that the alias token is not revoked or an uncertain determination that the alias token is revoked.

20. The system of claim 17, wherein each of the alias code segments is composed of elements selected from the group consisting of positive one and negative one.

* * * * *